United States Patent
Davis et al.

(10) Patent No.: US 8,127,042 B1
(45) Date of Patent: Feb. 28, 2012

(54) DATA DRIVEN CONNECTION RULE/CONSTRAINT ENGINE APPLIED TO TRAIL MANAGEMENT

(75) Inventors: Nigel Davis, Edgware (GB); Joyce Dunston, Barnet (GB)

(73) Assignee: Ciena Corporation, Linthicum, MD (US)

( * ) Notice: Subject to any disclaimer, the term of this patent is extended or adjusted under 35 U.S.C. 154(b) by 2271 days.

(21) Appl. No.: 10/051,928

(22) Filed: Jan. 18, 2002

Related U.S. Application Data

(63) Continuation-in-part of application No. 09/010,387, filed on Jan. 21, 1998, now Pat. No. 6,477,566.

(51) Int. Cl.
G06F 15/16 (2006.01)
(52) U.S. Cl. ........................ 709/238; 709/227
(58) Field of Classification Search .......... 709/223–226, 709/238, 227
See application file for complete search history.

(56) References Cited

U.S. PATENT DOCUMENTS

| | | | | |
|---|---|---|---|---|
| 5,708,778 A | * | 1/1998 | Monot | 709/228 |
| 5,727,157 A | * | 3/1998 | Orr et al. | 709/224 |
| 5,764,911 A | * | 6/1998 | Tezuka et al. | 709/223 |
| 5,793,362 A | * | 8/1998 | Matthews et al. | 709/224 |
| 5,872,932 A | * | 2/1999 | Schettler et al. | 709/226 |
| 5,987,513 A | * | 11/1999 | Prithviraj et al. | 709/223 |
| 6,041,347 A | * | 3/2000 | Harsham et al. | 709/220 |
| 6,047,320 A | * | 4/2000 | Tezuka et al. | 709/223 |
| 6,061,723 A | * | 5/2000 | Walker et al. | 709/224 |
| 6,118,936 A | * | 9/2000 | Lauer et al. | 709/224 |
| 6,223,219 B1 | * | 4/2001 | Uniacke et al. | 709/223 |
| 6,442,144 B1 | * | 8/2002 | Hansen et al. | 370/255 |
| 6,477,566 B1 | * | 11/2002 | Davis et al. | 709/223 |
| 6,477,568 B2 | * | 11/2002 | Borrett et al. | 709/223 |
| 6,477,572 B1 | * | 11/2002 | Elderton et al. | 709/224 |
| 6,732,170 B2 | * | 5/2004 | Miyake et al. | 709/223 |
| 6,765,908 B1 | * | 7/2004 | Chen | 370/392 |
| 6,934,290 B2 | * | 8/2005 | Story | 370/395.1 |

OTHER PUBLICATIONS

ITU-T Recommendation G.805 (Mar. 2000)—Series G: Transmission systems and Media, Digital Systems and Networks—Digital Networks—General Aspects (51 pages).

ITU-T Recommendation M.3010 (Jan. 2000)—Series M: TMN and Network Maintenance: International Transmission Systems, Telephone Circuits, Telegraphy, Facsimile and Leased Circuits (35 pages).

ITU-T Recommendation G.803 (Mar. 2000)—Series G: Transmission Systems and Media, Digital Systems and Networks—Digital transmission systems—Digital networks—General Aspects (52 pages).

* cited by examiner

*Primary Examiner* — Ramsey Refai
(74) *Attorney, Agent, or Firm* — Christopher & Weisberg, P.A.

(57) ABSTRACT

A method of identifying a connectivity characteristic structure in a network provided between a plurality of nodes in a network comprises the steps of acquiring node information detailing for each port of each node a connection characteristic of that port; collating for at least a plurality of nodes forming a plurality of trails in the network each node's respective acquired node information to form a set of connection characteristics; and analyzing the set of connection characteristics to determine a set of at least one rule describing a connectivity characteristic structure of the plurality of nodes.

20 Claims, 20 Drawing Sheets

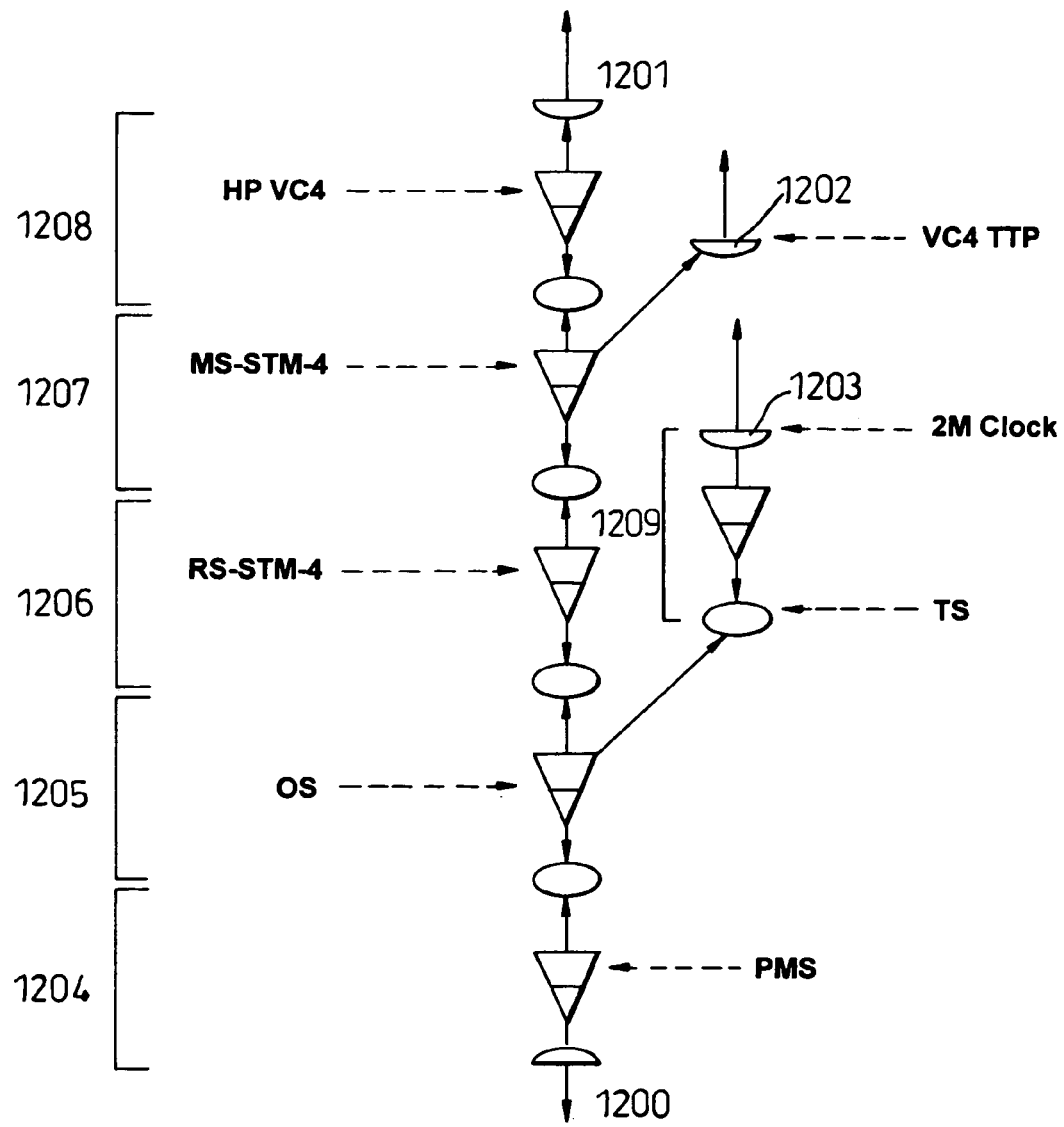
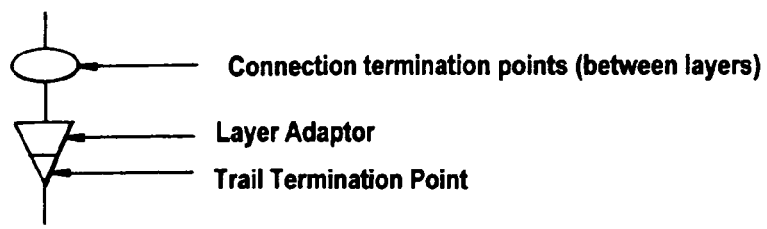
Fig. 7

Regen Section xdr_tmcom_adaptation_rules

```
adaptation_rules_structured_list<3>
<
mapping_group_Id = xdr_tmcom_HP_VC4TUGmap
adaptation_logic_list<1>
<
  instances_of_mapping_component=3
  mapping_component_structure=xdr_tmcom_TUG3
  mapping_component_tp
  <
    tp_type=xdr_tmcom_null_ttp_type
    tp_qualifier=xdr_tmcom_null_qualifier
    relationship_to_next_rule_in_logic_list=xdr_tmcom_null
  >
mapping_group_Id=xdr_tmcom_TUG3
adaptation_logic_list<2>
  instances_of_mapping_component=7
  mapping_component_structure=xdr_tmcom_TUG2
  mapping_component_tp
  <
    tp_type=xdr_tmcom_null_ttp_type
    tp_qualifier=xdr_tmpcom_null_qualifier
    relationship_to_next_rule_in_logic_list=xdr_tmcom_OR
  >
  instances_of_mapping_component=1
  mapping_component_structure=xdr_tmcom_null_mapping_group_Id
  mapping_component_tp
  <
    tp_type=xdr_tmcom_LP
    tp_qualifier=xdr_tmcom_VC3
    tp_sub_type_list<0>=<null>
    relationship_to_next_rule_in_logic_list=xdr_tmcom_null
  >
mapping_group_Id=xdr_tmcom_TUG2
adaptation_logic_list<2>
  instances_of_mapping_component=3
  mapping_component_structure=xdr_tmcom_null_mapping_group_Id
  mapping_component_tp
  <
    tp_type=xdr_tmcom_LP
    tp_qualifier=xdr_tmcom_VC12
    tp_sub_type_list<0>=<null>
    relationship_to_next_rule_in_logic_list=xdr_tmcom_OR
  >
  instances_of_mapping_components=1
  mapping_component_structure=
    xdr_tmcom_null_mapping_group_Id
  mapping_component_tp
  <
  tp_type=xdr_tmcom_LP
  tp_qualifier=xdr_tmcom_VC2
  tp_sub_type_list<0>=<null>
  relationship_to_next_rule_in_logic_list=xdr_tmcom_null
  >
```

HP VC4 TUG Map
TUG 3 or 1 VC4
TUG 3 = 7xTUG 2 or VC3
TUG 2 = 3xVC12 or VC2

Get List of Network Elements

Get List of Endpoints

Get Endpoints Templates

Get CTP Group Templates

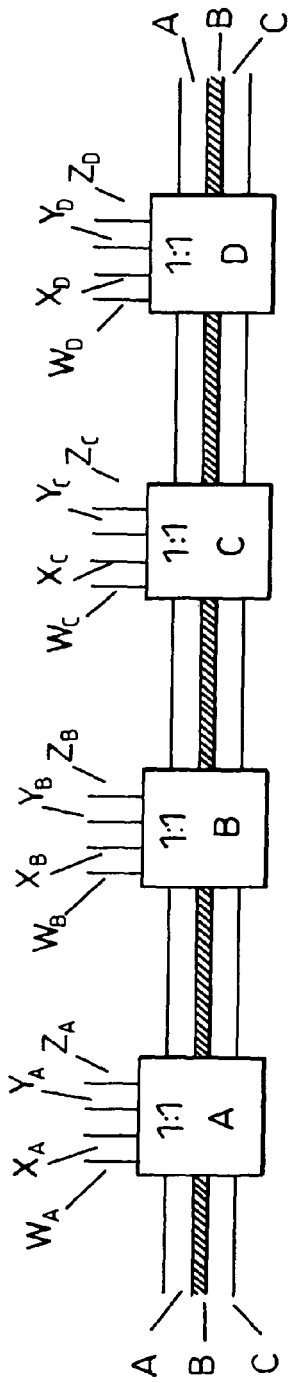
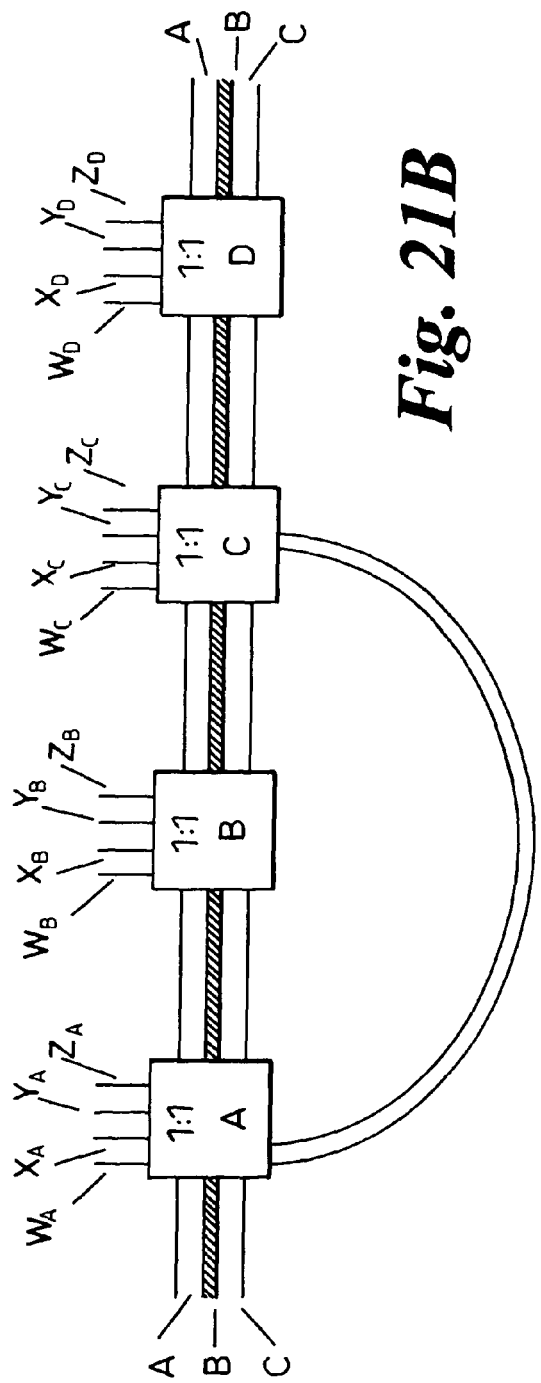
*Fig. 21A*
*Fig. 21B*

DATA DRIVEN CONNECTION RULE/CONSTRAINT ENGINE APPLIED TO TRAIL MANAGEMENT

RELATED APPLICATIONS

This application is a Continuation-In-Part of U.S. patent application Ser. No. 09/010,387 filed Jan. 21, 1998, now U.S. Pat. No. 6,477,566 entitled 'Capability Modelling Using Templates in Networks Management System' from which this application claims priority, and the full text of which is incorporated herein by reference.

FIELD OF THE INVENTION

The present invention relates to a method for determining network connectivity characteristics, and particularly though not exclusively to a method for determining characteristics of a communications network.

BACKGROUND OF THE INVENTION

The Applicant's U.S. patent application Ser. No. 09/010,387 describes how descriptive meta-data can be used to transfer of information across an interface between a network element ("NE") and a network management system ("NMS") and also describes how associated connection rule and constraint data can be transferred.

ITU-T standard G.805 addresses the generic functional architecture of transport networks and can be located on the world wide web via the www.itu.org website, as is known to those skilled in the art. G.805 describes how the transfer of telecommunications information from one point to other point(s) in a transport network may be modelled.

As is known to those skilled in the art, complex transport networks are often large with various components and an appropriate network model having well-defined functional entities is necessary for its design and management. In G.805 the transport network is described using a generic functionality which is independent of the implementation technology.

Using a model based upon a generic, functional description, the transport network can be described in an abstract manner using a set of abstract architectural components which are defined by the function they perform using processing information terms or by the relationships they describe between other architectural components. For example, an architectural component can be defined by a function which acts on information presented at input and which presents processed information at output. Thus the architectural component is a functional resource which can be defined and characterised by the information process between its input and output. Associating architectural components together enables network elements to be represented from which a "real" network may be constructed.

Within a transport network there exist repeated assembly patterns of internally static and/or deterministically constrained functional resources. In U.S. Ser. No. 09/010,387, templates are constructed to represent these patterns of functional resource structures.

The patterns are given a stability by basing them on an "endpoint" or stable anchor point in an NE. An example of an "endpoint" would thus be a physical port in the NE. A NMS needs only to know the name of the endpoint and an identifier for the pattern to be built from it to determine the functional resources associated with that endpoint. U.S. Ser. No. 09/010,387 describes how each endpoint has a pointer to a template which describes the set of functional resources (including the connection rules and constraints) related to that endpoint.

The term template is used here in its conventional form, i.e., it provides a model form for the meta-data describing a particular set of functional resources such that the meta-data can be utilised as a resource by various algorithmic applications.

In ITU Recommendation G.805 network resources, and the objects representing them, which have similar attributes can be grouped together, for example into object classes. Thus in a network management representation of a network resource, the network resource is an object which is characterized by its object class and object instance, and can possess multiple attribute types and associated values. Managed object classes and their properties are used to provide information which is to be exchanged across interfaces (as defined in recommendation M.3010, telecommunications network management (TMN) architecture, also of the ITU-T). Object classes however, may apply to various management areas, for example fault management and configuration management.

Conventionally, however, the concept of describing network resources has been subject to certain limitations, in particular, no attempt has been made to address issues in which the internal characteristics of the network resource, in particular, its physical connectivity restraints require modelling. For example, ITU recommendation G.774 assumes potentially infinite flexibility of configuration of a described physical resource, whereas in practice there are practical limitations on the possible configurations of a resource. For example, physical resources may be subject to hard wired restrictions as a result of restrictions in an application specific integrated circuit (ASIC). Thus, irrespective of the way in which the physical resource is modelled in an information base, physical limitations on connectivity of the physical resource may exist.

Consider a physical resource having four ports numbered 1 to 4. Ports 1 and 2 may be capable of connecting with each other. Moreover, port 1 and port 2 may be able to connect also to port 4. However, ports 1 and 2 may be incapable of connecting to port 3 due to a hard wired restriction on connectivity in the resource, and port 4 may not be able to connect to any ports, only to receive traffic from ports 1 and 2.

Recommendation G.774 does not provide a way of expressing such connectivity restriction, but assumes any port of the physical resource can be connected to any other port of the physical resource. Recommendation G.774 does not provide for description of such inherent capability restrictions in a physical resource.

U.S. Pat. No. 6,223,219, the full text of which is incorporated herein by reference, provides a trail management system which enables trails (effectively end-to-end network connections) to be modelled and stored in terms of a state model describing their operational state etc., in a database which can be accessed by a network operator. The network management system described in U.S. Pat. No. 6,223,219 enables trails to be identified within a network and enabled a network operator to check that the actual physical trails were consistent with the stored trail data.

As network complexity increases, it is extremely advantageous if a network operator is able to offer a variety of different services relating to connection cost, Quality of Service, protection etc.

Currently, when a network operator builds a trail, it is possible that certain features which would add value to the trail, such as additional protection options, are not apparent. It is extremely advantageous if during the construction of a trail, a network operator (regardless of whether this is a interactive or an automatic operation) is able to recognise that particular elements in the trail either have or could have certain features.

OBJECTS OF THE INVENTION

A first object of the invention seek to provide a means to identify connectivity characteristics of a plurality of network elements, whether adjacently provided along a trail or not, which conform to a predetermined connectivity structure. In this way, structures such as a BLSR or ULSR formed along at least a portion of trail can be identified even if such structures are not provided at the same logical or physical level as that portion or the remaining portions of the trail.

SUMMARY OF THE INVENTION

A first aspect of the invention comprises a method of identifying a connectivity characteristic structure in a network provided between a plurality of nodes in a network, the method comprising the steps of
 a) acquiring node information detailing for each port of each node a connection characteristic of that port;
 b) collating for at least a plurality of nodes forming a plurality of trails in said network each nodes respective acquired node information to form a set of connection characteristics;
 c) analysing said set of connection characteristics to determine a set of at least one rule describing a connectivity characteristic structure of said plurality of nodes.

The method may further comprise the steps of:
 f) analysing said collated plurality of sets of at least one rule describing a connectivity characteristic to determine if the connectivity characteristic structure conforms to a predetermined pattern;
 g) in the event the collated connectivity characteristic structure conforms to a pattern, assigning a pattern identifier to said collated sets.

Preferably, said method is performed during a trail build operation.

Alternatively, said method is performed after a trail build operation.

Preferably, said connectivity characteristic structure is indicated to a network operator performing said method.

Preferably, in the event a pattern identifier is assigned, an indication of said pattern identifier is provided to a network operator performing said method.

More preferably, said indication is provided visually. For example, by means of a graphical user interface an icon can be displayed or a window opened or other visual indication means provided.

Preferably, said pattern identifier indicates the network topology of said plurality of nodes over more than one layer of the network.

Preferably, said pattern identifier indicates a network topology of said plurality of nodes over a plurality of layers of the network.

Preferably, said pattern identifier indicates a network topology of said plurality of nodes over a plurality of layers of the network, and said network topology is taken from the group consisting of:
 BLSR; UPSR.

Preferably, said connectivity characteristic feature indicates a level of performance.

Preferably, said connectivity characteristic feature indicates a quality of service.

Preferably, said connectivity characteristic feature indicates protection supported.

Preferably, said connectivity characteristic feature indicates a shortest trail path.

Preferably, said connectivity characteristic feature indicates a cost. (For example, the cost associated with a trail).

Preferably, said connectivity characteristic feature indicates bandwidth.

Preferably, the method is used to determine at least one potential characteristic of a trail prior the trail being constructed.

Preferably, the method is used to determine at least one potential characteristic of a trail prior the trail being constructed, wherein the trail is provided within the same network layer as the layer with respect to which the connectivity structure is to be identified.

Preferably, at least one of said plurality of trails exists within a server layer of the network layer within with the connectivity structure is to be identified.

Preferably, at least one of said plurality of trails exists within a different layer of the network.

A second aspect of the invention relates to a method of identifying a connectivity characteristic structure in a potential trail provided between a plurality of nodes in a network, the method comprising the steps of
 acquiring node information detailing for each port of each node a connection characteristic of that port;
 collating for at least a plurality of nodes forming in said potential trail in said network each nodes respective acquired node information to form a set of connection characteristics;
 analysing said collated plurality of sets of connection characteristics to determine if the connectivity characteristic structure conforms to a predetermined pattern; and
 in the event the collated connectivity characteristic structure conforms to a pattern, assigning a pattern identifier to said collated sets, wherein said pattern indicates a network topology spanning more than one layer in the network.

Preferably, the method of the second aspect further comprises analysing said set of connection characteristics to determine another set of at least one rule describing a connectivity characteristic structure of said plurality of nodes.

A third aspect of the invention provides apparatus for performing steps in a method of identifying a connectivity characteristic structure in a network provided between a plurality of nodes in a network, the apparatus comprising:
 means arranged to acquire node information detailing for each port of each node a connection characteristic of that port;
 means arranged to collate at least a plurality of nodes forming a plurality of trails in said network each nodes respective acquired node information to form a set of connection characteristics; and
 means arranged to analyse said set of connection characteristics to determine a set of at least one rule describing a connectivity characteristic structure of said plurality of nodes.

Preferably, the apparatus includes computer software.

A fourth aspect of the invention provides a network management application arranged to perform steps in a method of identifying a connectivity characteristic structure in a network provided between a plurality of nodes in a network, the application including:
 means arranged to acquire node information detailing for each port of each node a connection characteristic of that port;
 means arranged to collate at least a plurality of nodes forming a plurality of trails in said network each nodes respective acquired node information to form a set of connection characteristics; and means arranged to analyse said set of connection characteristics to determine a set of at least one rule describing a connectivity characteristic structure of said plurality of nodes.

Preferably, the network management application comprises a computer program provided in a machine readable format.

Alternatively, the network management application comprises a signal provided in a form suitable for downloading onto computer apparatus.

Advantageously, the invention enables trail data to be manipulated and so enables a network operator to analyse the capabilities of a group of physical resources and determine if these conform to certain predetermined criteria. In this way, if a request is received for a specific functional requirement, for example, regarding performance, protection, capacity, etc., then a network operator will be able to determine whether this can be provided by a group of network resources.

Thus, if a group of network elements all have the same or similar channel connection rules, it is advantageous if a Network Operator is alerted to this as a trail is built that this common feature exists for that group. Similarly, if a group of Network Elements (NEs) can form part of a Bidirectional Line-Switched Ring (BLSR), it is extremely useful if a Network Operator can identify this capability from the connection capabilities of the group of NEs, which enables the Network Operator to have the ability to provision protection for trails as an ongoing process rather than route across predetermined protected routes. In this way, more flexibility is provided when building trails, enabling Network Operators to avoid congested links across the network.

Further, specific implementations according to the present invention recognize that within a self layer, a trail termination point is always bound to a set of adaptation rules for adapting the self layer of a transport protocol to an adjacent layer of a transport protocol, and that an adaptation of data signals between layers of a transport protocol is always bound to a trail termination point.

By providing a set of rules describing adaptation of data between protocol layers, and by coupling the adaptation rules to a set of rules describing exit and entry to a layer, a concise description of an internal architectural configuration of a network element may be achieved. A plurality of such descriptions may be referenced to each other by means of a set of inter end point connection rules to provide a complete network element template describing functionality capabilities and internal physical constraints of the network element.

Further, specific implementations according to the present invention may provide for inter port connection rules of high complexity, which are configurable per network element.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 7 illustrates schematically a data template representation of a port of a network element according to the specific implementation of the present invention, illustrating representation of different protocol layers within the port;

FIG. 13 illustrates schematically a set of adaptation rules of the data template representation of FIG. 12;

FIG. 21A illustrates an arrangement of nodes in a network between which a trail is established; and FIG. 21B illustrates an additional connectivity between the nodes shown in FIG. 21A.

DETAILED DESCRIPTION OF THE BEST MODE FOR CARRYING OUT THE INVENTION

Figure 1:
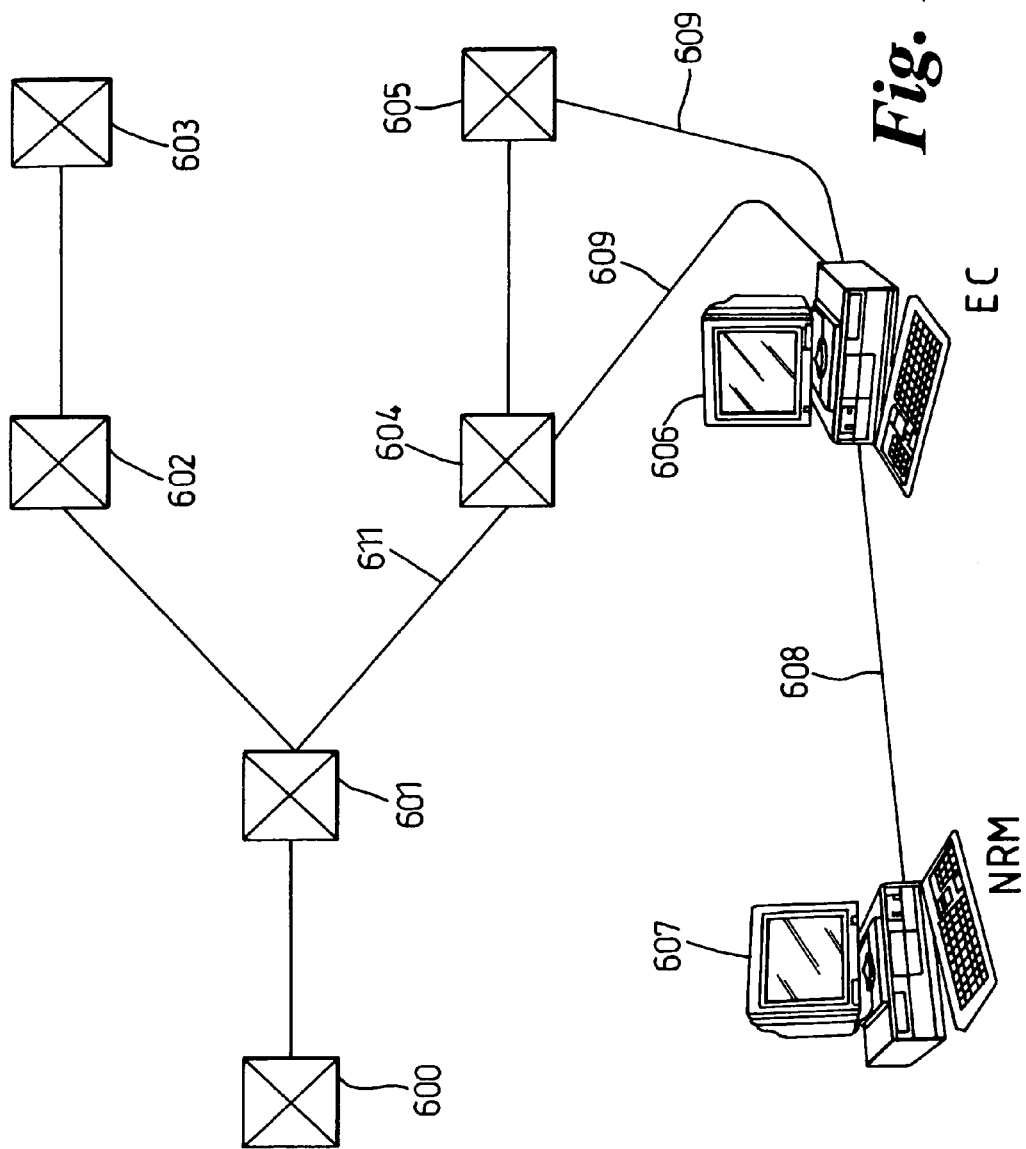
FIG. 1 illustrates an example of part of a communications network operating a network management system according to a first specific implementation of the present invention.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

The "Trail" Concept

The invention extends over any network of physical and logical resources in the telecommunications or computer networks domains, having a management information system. Networks operating asynchronous transfer mode (ATM), synchronous optical network (SONET), integrated service digital network (ISDN) and SDH are specific examples of such networks. However, the invention is not restricted to networks operating these specific protocols.

The term trail refers herein to a circuit, line, path or section into which at a first end a data stream can be inserted, and which at a second end a data stream can be output. Within the trail, a data stream may be packaged into one or a plurality of frames or protocols, eg an STM frame, an ATM frame or a SONET frame.

Generally, in a physical resource environment, circuit switched traffic follows paths and trails at various multiplex levels. Connections are terminated at connection termination points, and trails are terminated at trail termination points within physical resources. For example, within a communications network, there may be a restricted number of network elements which are capable of processing voice data. Operations on voice data at a voice level may be performed within those particular network elements. However, to transport traffic data between those network elements, there must be further transmission, such as provided by the SDH virtual container system. Thus, where a voice connection is to be made between geographically disparate network elements A and B, the connection may be routed via intermediate network elements D, E, F, G etc which may be in the VC-12 layer. However, the VC-12 layer itself, to connect between intermediate network elements E, F may need to be multiplexed into a higher bitrate layer, eg the VC-4 layer.

A "trail" within a transport network can be modelled as a "transport entity" in a server layer responsible for the integrity of transfer of "characteristic information" from one or more client network layers between server layer access points. In this context, a trail defines the association between access points in the same transport network layer. In a more general context, a trail can be modelled by combining a near end trail termination function, a network connection and a far end trail termination function. A trail termination is a transport processing function which defines the association between the access point and termination connection point which delimit the trail termination.

Equivalently, a "trail" can be modelled as a transport entity which consists of an associated pair of uni-directional trails capable of simultaneously transferring information. One uni-directional trail is responsible for the transfer of information from the input of a trail termination source to the output of a trail termination sink (the other vice versa). Thus a trail termination can also be described as a transport processing function consisting of a co-located trail termination source and sink pair.

As an example, a VC-12 trail comprises a route over which a VC-12 container envelope passes from its source to its destination. E.g., on entry to the VC-12 trail, the incoming data stream is packaged into a VC-12 envelope, and at the destination of the VC-12 trail, the data is recovered from the VC-12 container. Trails are described in more detail in ITU-T Recommendations G.803 and G.805.

Topology of a Network According to a First Embodiment of the Invention.

FIG. 1 of the accompanying drawings shows a schematic illustration of a section of an SDH network. The SDH network section illustrated comprises a plurality of network elements 600-605 operating under control of an element controller ("EC") 606 and managed by a network resource manager ("RMN") 607. The network manager 607 implements operations, administration and management of the network elements 600-605 through the element controller 606.

The element controller 606 communicates with the plurality of network elements 600-605 via any suitable known network management protocol over link(s) 609. The element controller 606 communicates with the network manager 607 via another suitable prior art protocol providing an external data representation over transmission link 608.

As an example, the element controller 606 may communicate to the network manager 607 using the known UNIX compatible external data representation (XDR) over transmission link 608 using the known transmission control protocol/internet protocol (TCP/IP). In alternative embodiments, instead of transporting templates and messages using a known external data representation, a common object related broker architecture interface definition language (CORBA IDL), in ASN1-GDMO, in SNMP, JAVA, or C+ structure definitions may be used for the templates and messages. For clarity of explanation, the XDR implementation will be referred to in the best mode hereafter.

Construction of Network Element/Controller/Manager Components

Figure 2:
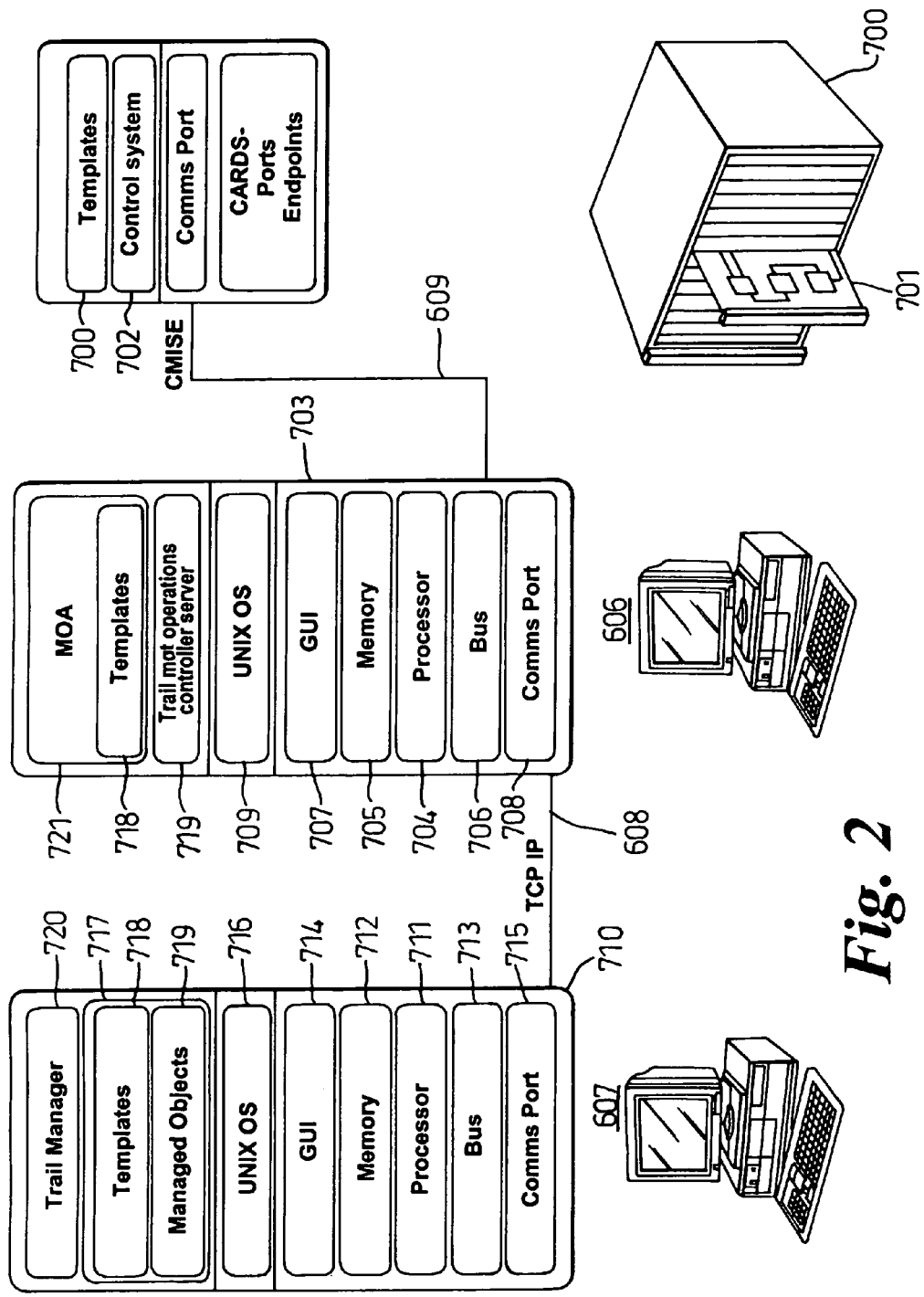
FIG. 2 illustrates schematically components and interconnection of a network element, element controller and network manager of the communications network of FIG. 1 herein.

FIG. 2 of the accompanying drawings provides a schematic breakdown of the construction of network element 605, element controller 606 and network manager 607 shown in FIG. 1.

Network element 605, for example a multiplexer or cross connect, comprises a casing or cabinet having one or a plurality of shelves, each shelf containing a plurality of cards 701 which carry the physical resources of the network element 605. The physical resources are carried by the cards may form part of processors, switch fabrics, line terminations etc depending upon the type of network element 605. For example, in the case of an SDH multiplexer, each card 701 may support a number of physical ports, where each port supports a plurality of connections.

The network element 605 is provided with a local control system 702 comprising a data processing capability configured to send and receive messages over a operations administration and maintenance channel of link 609 to provide control of network element functionality.

In one embodiment of the invention, the element controller 606 comprises a workstation 703 and the network manager 607 comprises a work station 710, for example, Hewlett Packard 9000 series workstation(s). These workstations 703,710 configured to communicate with each other over link 608.

Returning to FIG. 1, the network elements 600-605 provide physical resources for the SDH network. The physical resources can be arranged into one or more set(s) of pre-configured physical and logical structures. For example, a physical port is a physical resource, whereas a logical port floating between cases is an example of a logical resource. Hence an example of a pre-configured logical structure is a logical structure of connection capabilities between individual ports. Thus the network elements 600-605 which comprise part of the SDH network can be represented as a limited set of physical arrangements of hardware components or equivalently, as a limited set of pre-configured physical structure types.

Advantageously, this limited set of pre-configured physical structure types can be represented by a limited set of data template types 718.

Similarly, the logical connectivity between physical pre-configured structures tends to repeat across a family of network elements, allowing the pre-configured logical structure types to be represented by a limited set of data template types 718. In this way, each different type of network element 600-605 having a particular capability and connectivity is represented by a different set of template types.

The limited set of data templates 718 representing the physical resources of the network elements controlled by the element controller 606 is stored by the element controller 606 and sent to the network manager 607 over communications link 608. Each template 718 describes the capability and internal connectivity of one or a plurality of pre-configured structures, e.g. ports within each network element 600-605.

The network manager 607 stores the received data templates 718 in a managed object base (MOB) 717. MOB 717 contains data describing characteristics and configurations of the network elements 600-605 under the management of the network manager 607. Each network element 600-605 is represented as a managed object 719 in the MOB 717, in accordance with the known ITU-T recommendation M.3010. MOB 717 thus comprises a database from which a plurality of network management applications resident on the network manager 607 may source data describing the network, for example in order to perform network management operations such as fault management, provisioning, and configuration operations. Within the element controller 606, a managed object agent (MOA) 721 uses data of the templates 718 to manage the network elements 600-605 according to instructions received from the network manager 607.

The templates 718 are stored in the MOB 717 in addition to the managed objects 719. The templates 718,718a may be read by one or more applications resident on the network manager 607. One such application comprises a trail manager application 720 for managing creation, deletion and modification of trails across the network, such as U.S. Pat. No. 6,223,219 describes.

Optionally, each network element 600-605 may store one or more templates 718a describing its ports. Installation of templates 718a describing a network element into the network element 600-605 is left as an option for a manufacturer of the network element 600-605.

Figure 3:
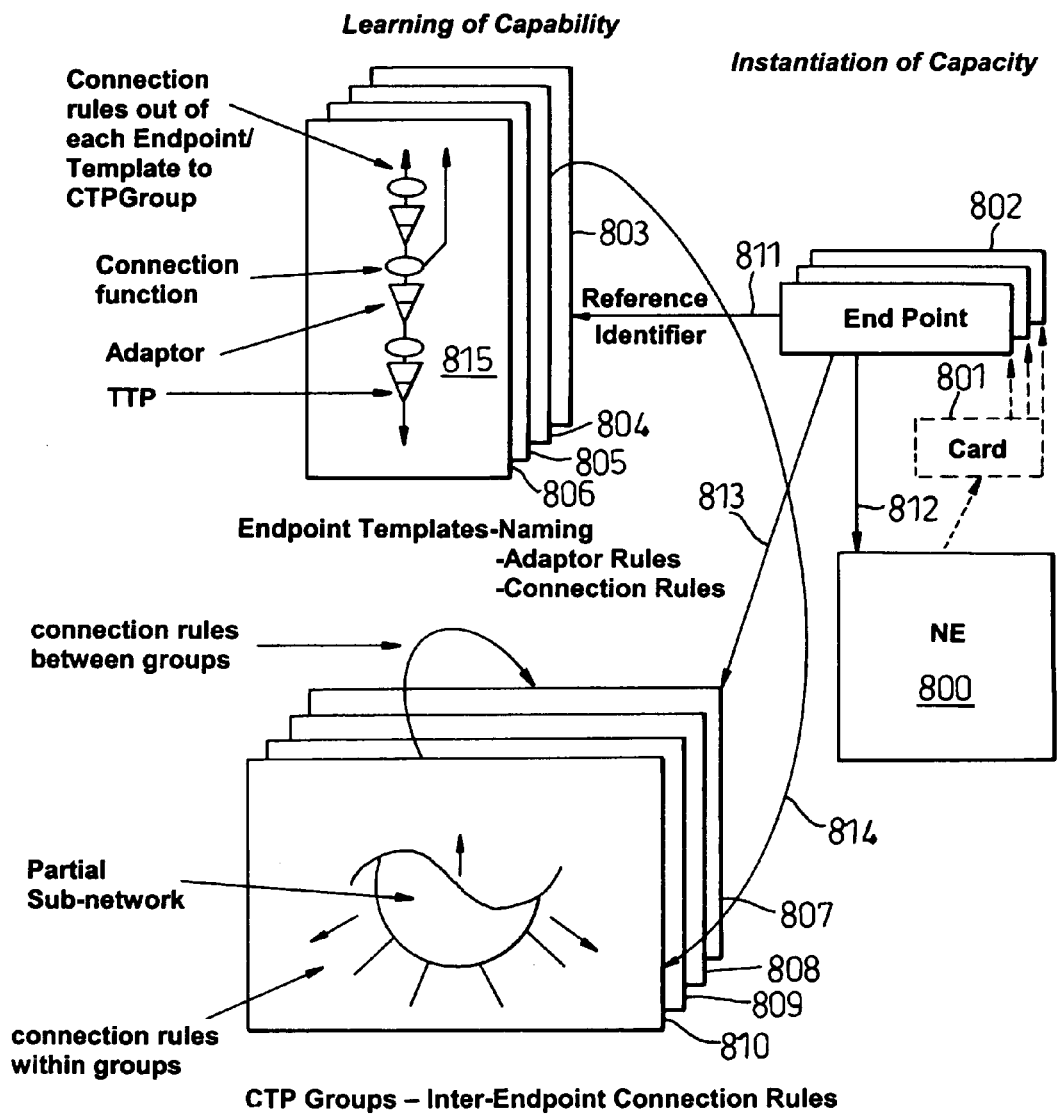
FIG. 3 illustrates schematically a network element, having a plurality of cards, the cards represented by a set of data templates according to a specific implementation of the present invention.

Referring now to FIG. 3 of the accompanying drawings, a system for describing and communicating internal configuration and capability of a network element 605 using a set of data templates and messages will now be described. Network element 605 comprises a plurality of cards 801, each card 801 having a plurality of physical and/or logical ports.

A logical port can exist within the network element 605 and can have a similar layer structure and characteristic(s) as a physical port. Unlike a physical port, however, a logical port does not bind to any physical port external to the network element 605. A logical port does not need to be bound to one card 801; it may float across a plurality of cards 801 within a network element 605. The physical or logical ports of a card 801 may all be of a same type, or several different types of port may be resident on a card 801, depending on the specific manufacture of the network element 605 itself.

Each physical or logical port is represented in the specific implementation herein as a corresponding respective end point. In this specification, the term "end point" is used to describe a port comprising a receive port, and (optionally) a transmit port. For example, the ability of a port to support input/output can be represented as a pair of uni-directional ports. A uni-directional port thus represents either the output of a trail termination source of a uni-directional link connection or the input to a trail termination sink or uni-directional link connection (in accordance with ITU-T recommendation G.805).

Each port of the network element 605 is described by reference to its own end point data 802 which is unique to the end point and is enrolled at the element controller by means of an end point message. The end point message comprises one or a plurality of end point data. The end point data comprises a reference data, which refers uniquely to one end point, and which refers to one or more data templates. A card has a plurality of end points, depending on how many physical and logical ports it has.

FIG. 3 shows schematically two different types of template. Firstly, a set of end point templates 803-806 describe individual port types. Secondly, a set of connection termination point (CTP) group templates 807-810 describe the inter-connectivity of the ports.

An end point data 802 of a port comprises a first reference identifier 811 to an end point template 803, a second reference identifier 812 to a port, and may comprise a third reference identifier 813 to a CTP group template 807. An end point template, eg 804, may also include a reference identifier 814 to a CTP group template 810. The features of the two types of templates will now be described briefly in more detail.

End Point Templates

Each end point template 803-806 contains several features. One feature comprises a layer tree 815 including all of the types of trail termination point with the number of instances of the end points associated with the end point template. Other features comprise an instantiation naming relationship between trail termination points in the tree 815, adaptor rules for each trail termination point type in the tree 815 (which are used by each layer of the tree 815 to adapt to other layers), and connection rules for each trail termination point type or derived connection termination point type in the tree 815.

CTP Group Templates

Connectivity between individual end points is represented by the set of CTP group templates 807-810. CTP group templates 807-810 contain inter-end point connection rules which supply the compatibility and connectability rules for operation across a trail at each layer of the model, and convey relationships between ports within a network element 605.

All types of connection, eg uni-directional, bi-directional, which can be made between ports are capable of being described by the CTP group templates 807-810. The CTP group templates 807-810 model physical limitations on inter-port connections, e.g. due to lack of buses, physical tracks, limited capacity, etc. Information contained in a CTP group template 807-810 may be used by higher applications in the management system (for example, the trail manager application 720 shown in FIG. 2) to determine whether a connection can be made or not.

Construction of Templates

The end point templates 803-806 and CTP group templates 807-810 are constructed from assembling a plurality of smaller data templates each representing a trail termination point in a layer of the transport network. Such data templates are referred to herein as "trail termination point templates" and contain data describing a trail termination point, adaptation nodes concerning adaptation of that trail termination point, a client layer, and rules describing connectivity of that trail termination point to other trail termination points within its layer (intra-layer rules), and also connection rules describing connectivity of that trail termination point to other layers (inter-layer rules).

Construction and content of the end point data 802, end point messages and data templates will now be described:

End Point Data

An end point data 802 represents an instance of a port. Each end point data 802 comprises a reference identifier 811 to a corresponding end point template 803. A set of end point data 802a,b,c of a card 801 provides a set of reference identifiers 811a,b,c to one or more end point templates 803-807. Each end point template 803-807 describes a type of physical or logical port of the card 801.

An end point data 802 comprises the following:
- a list of locations of connection termination points of a port. A first location (primary location) relates to a receive port, and a second location (if present) relates to a transmit port. If any special supporting hardware is present in the port, the location of this hardware may be referenced by a third location. In the best mode herein, one location is listed, this being the primary location which is used to refer to the end point, and is optionally provided by a second reference identifier 812 to a port.
- a reference identifier 811 to an end point template 803
- (optionally) a reference identifier 814 to a connection termination point group template
- a text string name of the end point as used on the element controller or at the network element. For example the G scheme number for the TN-16X, or the shelf/slot number of the TN-4X such as "301" naming scheme.
- a text string user label for the end point.

End Point Messages

An end point message of a port contains the end point data 802 of that port. Referring again now to FIG. 2, end point messages are transmitted from the network elements 600-605 to the element controller 606 over the operations administration and management channel 609. The end point messages comprise the end point data 802 (see FIG. 3) (one per each port instance) carried within a protocol used for the operations administration and maintenance channel, eg a prior art CMISE protocol. The end point messages are relatively short, and occupy relatively little data carrying capacity on the OAM channel. By transmission of end point messages over the OAM channel to enroll ports of a network element 605, by reference to existing end point templates 718 stored at the element controller 606, significant reductions in enroll times for ports of network elements 600-605 may be achievable compared with prior art management systems.

End Point Templates

Each end point template 803-806 is written specific to a particular port type. A plurality of individual ports of a same type share a same end point template 803-806.

Within an end point template 803-805, a port is described in terms of its layer structure, eg SDH layers, and in terms of a plurality of termination points and adaptations, and the constraints on connectivity between layers within that port. Each end point template 803-805 describes connectivity constraints between layers within a set of termination points which bind directly to a particular logical or physical port which the end point template 803-805 describes.

Connectivity between layers is described herein as vertical connectivity. Connectivity between different ports at a same layer is referred to herein as horizontal connectivity. A set of end point templates 803-806 describes the capacity of a network element 605 and any limitations on the capabilities of the network element 605.

An end point template 803-806 may be implemented as a list of parameters, which are read by a parser in the network manager 607, and in the element controller 606 (see FIG. 2). In the best mode herein, an end point template 803-806 comprises a list of parameters identifying the end point template 803-806 and a list of parameters describing a content of an end point.

An end point template 803-806 comprises the following elements:
- A plurality of trail termination point templates within the port.
- An end point template identifier parameter.
- A parameter identifying a directionality of the connection termination point.
- a reference identifier to a list of CTP group templates associated with the end point.
- a number of instances of connection termination points within the port.

Figure 4:
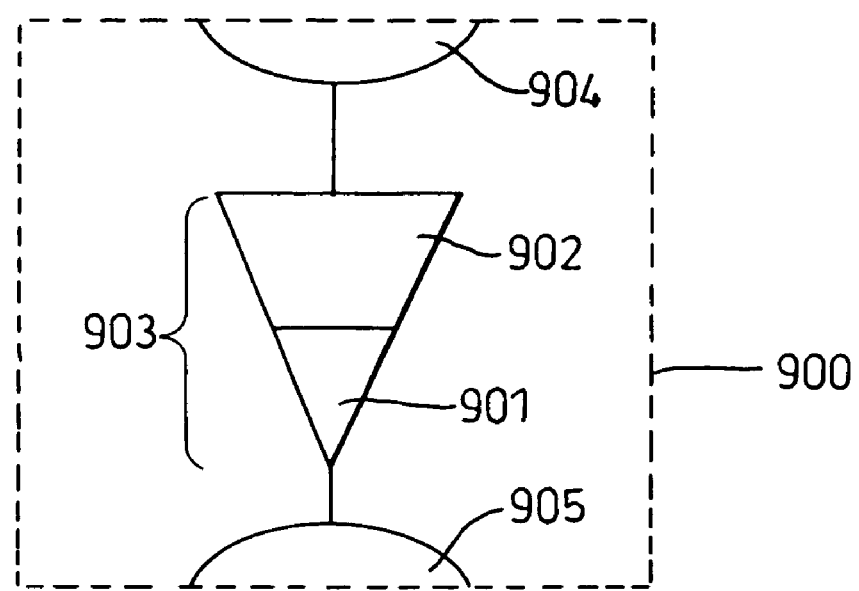
FIG. 4 illustrates schematically a trail termination point data template representation according to the specific implementation of the present invention.

For example, an end point template 803-807 is constructed from one or a plurality of trail termination point templates 900 (see for example, FIG. 4 of the accompanying drawings).

The end point identifier uniquely identifies an individual end point template. Each end point template identifier comprises an end point template number, an end point template name and an endpoint template parser vintage parameter. The end point template number is unique to, a specific end point template and describes details of the template, for example the type and version of the template. In a large network comprising a large number of different network elements, a large number of different port types may exist, each one having a unique end point template. Further, as ports are upgraded, existing templates may need to be upgraded. The end point template number and end point template name are specific to a particular template type and do not change once allocated to that end point template type. If a change to a template is necessary, then a new end point template having a new end point template identifier is produced. As end point templates are modified, the network manager and element controller may operate different parser versions to each other. The vintage parameter enables identification of the appropriate vintage of parser for use with the end point template.

The parameter identifying a directionality of the connection termination point may specify whether direction is or is not applicable, whether the connection is bi-directional or uni-directional, whether a transmit port is uni-directional and whether a receive port is uni-directional.

Trail Termination Point (TTP) Template

Referring to FIG. 4 herein there is illustrated terminology for describing a trail termination point at a layer of a synchronous digital hierarchy network. An end to end trail may be described by assembling a plurality of such trail termination points. Although the example of FIG. 4 herein is described specifically with respect to a SDH environment, the naming scheme illustrated by FIG. 4 is applicable more generally to ports operating other protocols having terminations and layers. For example the North American Synchronous Optical Network (SONET) protocol, or the asynchronous transfer mode (ATM) protocol in which there are adaptation layers, virtual circuits and virtual paths.

In a naming scheme according to a specific method of the present invention, internal capabilities of physical resources of a communications network are described by way of a trail termination point template 900.

A parameter describing a trail termination point template 900 (struct xdr_tmcom_ttp_template) comprises a parameter describing details of a trail termination point; directionality of the trail termination point: a number of instances of the trail termination point; connection rules concerning connections to other trail termination points in a same layer; a list of adaptation rules for adapting between layers: a list of assembly rules and a list of connection rules for connecting the trail termination point to a client layer.

An example of a data structure describing a trail termination point template 900 may be as follows:

```
struct xdr_tmcom_tp_details (
    xdr_tmcom_tp_type              tp_type;
    xdr_tmcom_tp_type_qualifier    tp_qualifier;
    xdr_tmcom_tp_sub_type          tp_sub_type_list<>;
);
struct xdr_tmcom_ttp_template (
    xdr_tmcom_tp_details
                                   ttp_details;
    xdr_tmcom_directionality
```

FIG. 4 of the accompanying drawings illustrates a naming scheme for a trail termination point template. In FIG. 4, triangle symbol 901 represents a trail termination point, either bi-directional or uni-directional. Quadrilateral symbol 902 represents an adaptation layer, either bi-directional or uni-directional. Symbol 903, an irreducible composite of symbols 901 and 902, represents that an adaptation is always associated with a termination point. Inverted semi-ellipse symbol 904 represents an entry connection function from a client layer into an adaptation represented by symbol 901. Semi-ellipse symbol 905 represents an exit connection function from trail termination point 902.

The trail termination point template 900 comprises an irreducible segment for describing a trail termination point within a port. The assembly of entry connection function 904, adaptation layer 901, trail termination point 902 and exit connection function 905 in the specific implementation herein recognizes a strict binding of functions represented by those symbols in a transport entity. In practice, these elements are always associated with each other and are never separate.

A plurality of trail termination point templates 900 as illustrated in FIG. 4 may be assembled together to provide a comprehensive definition of internal structure and capability of a network element. A plurality of trail termination point templates 900 are assembled into an end point template 803-806 as described previously herein for describing a port type. The end point templates 803-807 are reusable, and may be referenced by a plurality of ports of a same type within a network element 605. Elements represented by symbols 901-905 in FIG. 4 are further detailed as follows: In the following, description of the elements 901-905 is made with reference to the XDR language in which the templates are carried in the specific implementation herein.

A trail termination point 901 is represented as an object. Attributes of such an object comprise:

termination point type (tp_type)—this attribute defines the type of trail termination point, for example a physical media section termination point, a regenerator section termination point, an optical section termination point, a multiplex section termination point, or a higher order path termination point, layer;

a termination point qualifier (tp_qualifier)—data which qualifies the "type" data. For example where the type of termination point is a physical media section termination point, this may be qualified by further specifying that the transmission medium is fiber. In other cases, there may be no qualifiers, in which case a null value is entered as a tp_qualifier attribute. In other cases, for example where the type is a higher path (HP) the qualifier may specify a VC4 layer;

a termination point sub-type list (tp_sub_type<0>)—an attribute comprising an ASCII text field describing further subsidiary details about the type of termination point. This attribute is optionally filled, and a null value may be entered.

Adaptation element 902 comprises a set of adaptation rules describing adaptation between a self layer of a trail termination point and a client layer of the trail termination point.

Adaptation as represented by quadrilateral symbol 902 is defined generically in ITU-T recommendation G.805 as "a "transport processing function" that consists of a co-located adaptation source and sink pair", or alternatively, as a "transport processing function" which adapts a server layer to the needs of a client layer. The "adaptation" function defines the server/client association between the "connection point" and "access point" and these points therefore delimit the "adaptation" function. "Adaptation" functions have been defined for many "client/server" interactions" (see ITU-T Recommendation G.803 for example).

Adaptation Rules

The layer tree in each end point template specifies the types of trail termination point associated with a specific end point. Each layer of the tree adapts to the other layers by means of a set of adaptation rules.

In the specific implementation herein, an example of a set of adaptation rules is represented by a set of parameters as follows:

```
struct xdr_tmcom_adaptation_rules (
    xdr_tmcom_mapping_          mapping_group_id<>;
    group_id
    xdr_tmcom_adaptation_       adaptation_logic_list<>;
    rules_logic_list
);
```

| Parameter | Legal Range |
| --- | --- |
| ctp_group<> | 0 for no parameter of default |
| | 1 or more ctp groups where rule requires this parameter |
| type_of_connections_allowed | 0 for no connection type or default |
| | 1 or more connection type where rule requires this parameter |
| specific_cp_name<> | 0 for no ctp or default |
| | 1 or more ctp where rule requires this parameter |
| list_of_valid_points<> | 0 where rule does not require points |
| | 1 or more where rule requires this parameter |
| specific_ttp_type<> | 0 for no ttp of default |
| | 1 or more ttp where rule requires this parameter |
| allowed_directionality | where it differs from the TTP |
| broadcast_limit | 1 where no broadcast |

```
struct xdr_tmcom_adaptation_rules_logic_list (
    unsigned long            instances_of_mapping_component;
    unsigned long            capacity<>;
    xdr_tmcom_mapping_       mapping_component_structure;
    group_id
```

-continued

| | |
|---|---|
| xdr_tmcom_tp_details | mapping_component_tp; |
| xdr_tmcom_adapter_rule_operator | |
| ); | relationship_to_next_rule)in_logic_list; |

| | |
|---|---|
| instances_of_mapping_component | number of instances of the mapping component currently being defined. |
| mapping_component_structure | describes the id of the mapping group which this layer adapts to. |
| capacity | This value should be set to NULL (empty list) for SDH. |
| mapping_component_tp | tp_details for this mapping component. |
| Relationship_to_next_rule_in_logic_list | logic operator describing the relationship between the current adaptor rule in this layer and the next (if any) adaptor rules in this layer. |

Note:
if it maps to a ttp then the mapping component will be null and vice versa.

```
Enum xdr_tmcom_mapping_group_id (
    xdr_tmcom_null_mapping_group_id,
    xdr_tmcom_HP_VC4_TUGmap,
    xdr_tmcom_HP_VC3_TUGmap,
    xdr_tmcom_MS_AUGmap,
    xdr_tmcom_TUG2,
    xdr_tmcom_TUG3,
    xdr_tmcom_ATM_VPmap,
    xdr_tmcom_AUG
);
```

| Value | Description |
|---|---|
| 0 | Null mapping group |
| 1 | HP_VC4_TUGmap |
| 2 | HP_VC3_TUGmap |
| 3 | MS_AUGmap |
| 4 | TUG2 |
| 5 | TUG3 |
| 6 | ATM-VPmap |

```
enum xdr_tmcom_adapter_rule_operator (
    xdr_tmcom_null_adapter_rule_operator
    xdr_tmcom_OR
    xdr_tmcom_AND
;
```

A set of end points referencing to a network element describe all the physical and logical ports available within that network element, ie the physical and logical resource capacity available in that network element. For each end point an end point template describes the vertical connectivity constraints of termination points of the corresponding port. End point templates describe intra-port connectivity and model inherent connectivity constraints within a port, eg as limited by hardware. Horizontal connectivity capabilities between different ports, at various different protocol levels is described by a set of inter end point connection rules specific to the network element. Such connection rules are referred to herein as CTP group templates.

CTP Group Templates

CTP group templates describe how end point templates are interconnected in terms of a set of connection rules. A set of end point templates, end point data and CTP group templates corresponding to a network element inter-relate with each other to give a detailed description of resources available within a network element, and the capabilities which they provide. The end point data, end point templates and CTP group templates describe all ports, including trail termination points at all layers within the ports. A single network element has one or a plurality of CTP groups. Each individual CTP group is represented as an instance of a CTP group template. A CTP group template comprises the following elements:

A CTP group identifier which is unique to a specific CTP group template and describes the type and version of the CTP group template. The identifier comprises a group_number parameter and a group name parameter. The group_number and group name parameters are unique to a particular CTP group template and are not changed once allocated to that template. If a new CTP group template is created, then a new template identifier is allocated to that template. The group name parameter provides a meaningful description of the template, for example "TN4x-STM4-all_endpoints_vers_1_1". Additionally, the template identifier comprises a vintage parameter (ctp_group_parser_vintage) which identifies the version of parser for which the CTP group template was written.

The inter end point connection rules describe:

connections between termination points of different ports at a same layer. Each connection termination point group comprises connection rules specifying connectivity of termination points at a same layer between different ports; and connections between groups of termination points at one layer and groups of termination points at other layers. Connections between termination points at one layer and termination points at other layers are described as a set of connection rules between groups of termination points.

Connection rules are used at the connection termination points to describe which layer(s) a current layer may connect to. The connection rule express relationships between adapted trail termination points, and other trail termination points of a compatible layer, both inside the end point template and outside the end point template as appropriate.

An example of a set of connection rules used in the specific implementation herein, various ones of which may be used internally within end point templates, and various ones of which may be used in CTP groups, externally of end point templates is as follows:

| Parameter | Comments |
|---|---|
| connection_rule | Rule for connectivity |
| rule_parameter_list | 0 for entries with no parameters, 1 for entries with parameters |

```
enum xdr_tmcom_connection_rule_name (
    xdr_tmcom_must_not_connect_to_ctp_in_group,
    xdr_tmcom_may_connect_to_any_ctp_in_group,
    xdr_tmcom_may_connect_to_any_ctp_
    on_one_to_one_basis_in_group,
    xdr_tmcom_use_ctp_group_rules,
    xdr_tmcom_must_connect_to,
    xdr_tmcom_must_not_connect_to,
    xdr_tmcom_may_connect_to,
    xdr_tmcom_must_be_connected,
    xdr_tmcom_may_connect_to_self,
    xdr_tmcom_broadcast_limit,
    xdr_tmcom_connects_externally,
    xdr_tmcom_reversion_supported,
    xdr_tmcom_reversion_always_enabled,
    xdr_tmcom_protection_switch_state_not_controllable,
    xdr_tmcom_protection_switch_always_auto,
    xdr_tmcom_protection_switch_always_manual,
    xdr_tmcom_supports_only_subnetwork_protection,
    xdr_tmcom_supports_only_path_protection,
```

-continued xdr_tmcom_supports_path_and_subnetwork_protection,
);

| connection rule name | parameter(s) from xdr_tmcom_rule_parameter | comments |
|---|---|---|
| xdr_tmcom_must_not_connect_to_cpt_in_group | one or more ctp_group | If no group name then it assumes all groups that the end point belongs to |
| xdr_tmcom_may_connect_to_any_ctp_in_group | one or more ctp_group one or more specific_ctp_name AND/OR list_of_valid_points AND/OR type_of_connections_allowed | If no group name then it assumes all groups that the end point belongs to |
| xdr_tmcom_may_connect_to_any_ctp_on_one_to_one_basis_in_group, | one or more ctp_group one or more specific_ctp_name AND/OR one or more specific_ttp_type AND/OR list_of_valid_points AND/OR type_of_connections_allowed | If no group name then it assumes all groups that the end point belongs to |
| xdr_tmcom_use_ctp_group_rules | — | Used in end point templates. Assumes that all ctp groups identified in the end point (template) should be used. if this rule is not states then the ctp group rules d not apply and connectivity is only possible in the end point |
| xdr_tmcom_must_connect_to, | one or more specific_ctp_name AND/OR one or more specific ttp_type AND/OR list_of_valid_points AND/OR type_of_connections_allowed | Assumes that connection is a 1:1 for all payload elements adapted from the layer unless stated (ie may be stated in bulk at the layer or in detail in client layer terminology if in detail then all connections must be stated). More than one ctp can be stated for protected connections. Can be used between end points in special cases but normally used within end point templates. Valid points indicated to force specific connection orientation. |
| xdr_tmcom_must_not_connect_to | one or more specific_ctp_name AND/OR one or more specific_ttp_type AND/OR type_of_connections_allowed | |
| xdr_tmcom_may_connect_to | one or more specific_ctp_name AND/OR one or more specific_ttp_type AND/OR list_of_valid_points AND/OR type_of_connections_allowed | Assumes that connection is a 1:1 for all payload elements adapted from the layer unless sated (ie may be stated in bulk at the layer or in detail in the client layer terminology). Can be used between end points in special cases but normally used within end point templates |
| xdr_tmcom_must_be_connected | — | If several choices of connection (via other rules but one of the choices must be used). |
| xdr_tmcom_may_connect_to_self | — | Allows for uni-directional restrictions. Would be stated if a unidirectional connection could be performed between rx and tx of the same Connection Termination Point |
| xdr_tmcom_broadcast_limit | broadcast_limit | If unidirectional connctiona then should be 1 unless broadcast is allowed in which case this will be limit unless no limit in which case should be set to maximum value |
| xdr_tmcom_connects_externally | — | Goes outside this NE (only for PMS). |
| xdr_tmcom_reversion_supported | connection type, connection points, directionally | allows the MOA to indicate that a particular CTP group or end point can support revertive connections. Connection points parameter used to distinguish between a switch and b switch if necessary. |
| xdr_tmcom_reversion_always_enabled | connection type, connection points, directionality | only used in conjunction with reversion_supported, allows the MOA to indicate that a particular CTP group or end point can support revertive connections. Connection points parameter used to distinguish between a switch and b switch if necessary. |
| xdr_tmcom_protection_switch_state_not_controllable | connection type, connection points, directionality | allows the MOA to indicate that a particular CTP group or end point does not support control of a protection switch position. Only used where connection type could support protection. Connection points parameter used to distinguish between a switch and b switch if necessary. |
| xdr_tmcom_protection_switch_always_auto | connection type, connection points, directionality | allows the MOA to indicate that a particular CTP group or end point only supports automatic protection switching (not manual). Only used where connection type could support protection. Connection points parameter used to distinguish between a switch and b switch if necessary. |
| xdr_tmcom_protection_switch_always_manual | connection type, connection points, directionality | allows to MOA to indicate that a particular CTP group or end point only supports manual protection switching (not auto). Only used where connection type could support protection. |

-continued

| | |
|---|---|
| | Connection points parameter used to distinguish between a switch and b switch if necessary. |
| xdr_tmcom_supports_only_subnetwork_protection | — |
| xdr_tmcom_supports_only_path_protection | — |
| xdr_tmcom_supports_path_and_subnetwork_protection | — |

```
struct xdr_tmcom_rule_parameter (
    xdr_tmcom_ctp_       ctp_group<>;
    group_id
    xdr_tmcom_           type_of_connections_allowed<>;
    connection_type
    xdr_tmcom_               specific_ctp_name<>;
    universal_location
    xdr_tmcom_           list_of_valid_points<>;
    connection_points
    xdr_tmcom_           specific_ttp_types<>;
    tp_details
    xdr_tmcom_           allowed_directionality<>;
    directionality
    long                 broadcast_limit;
);
```

An example of parameters describing a list of CTP groups may be as follows:

```
struct xdr_tmcom_ctp_group_list (
    xdr_tmcom_ctp_group_id ctp_group;
    unsigned short         instance_of_ctp_group;
);
```

The template set of the specific implementation herein may have a number of advantages over prior art ways of describing network elements as follows:

Firstly, within recommendation G.774, individual transport layers tend to be floated, so that they are not specifically numbered to any particular port in a network element. However, the specific implementation herein provides a method of linking transport layers.

Secondly, in the abstract syntax notation one (ASN1) model relationship in ITU-T recommendation X.208, models are described by data specification. In contrast, in the present specific implementation, models are prescribed by way of specific inheritance.

FIG. 5

Figure 5:
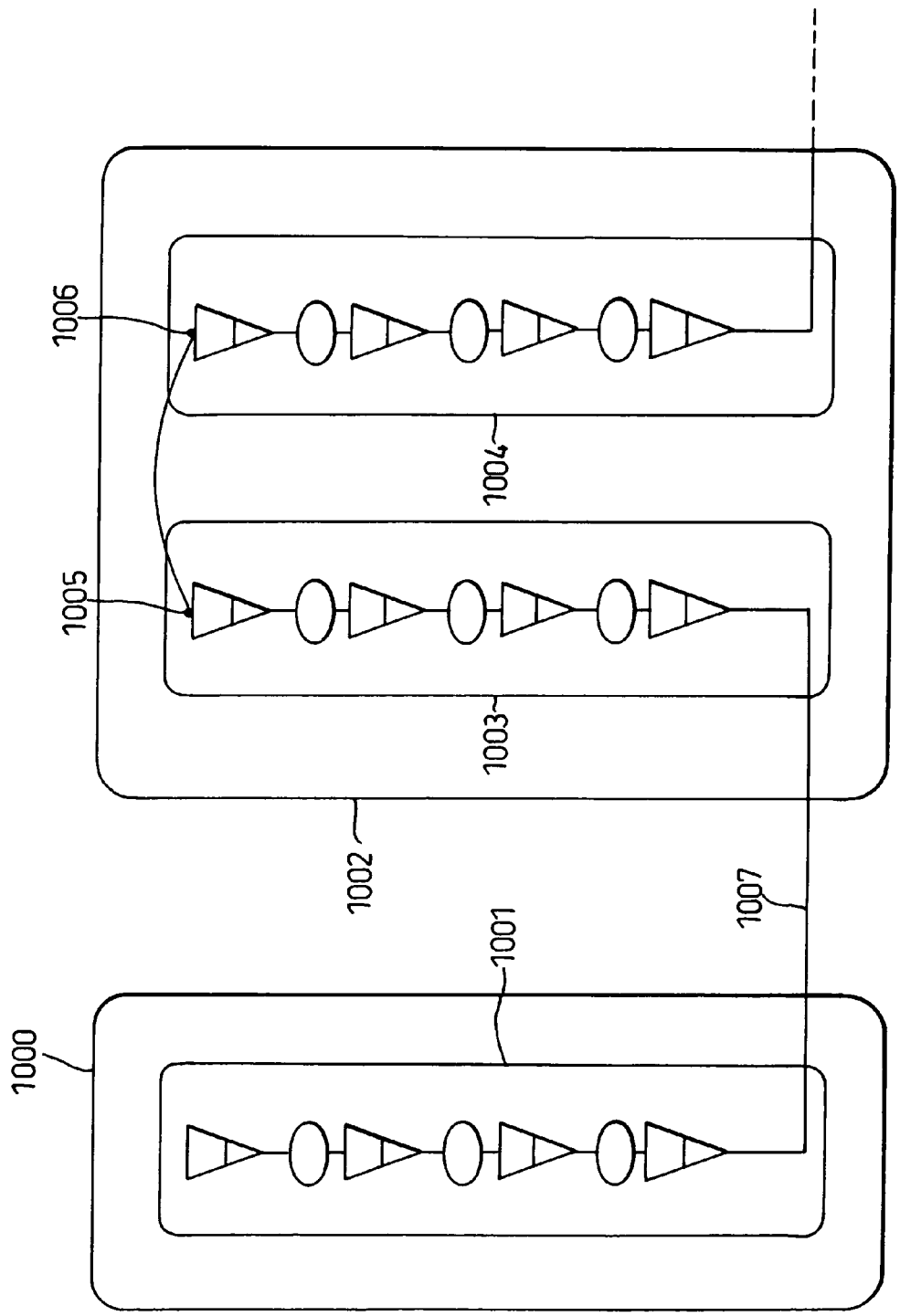
FIG. 5 illustrates schematically an example of a data template representation of ports of first and second network elements according to the specific implementation of the present invention.

Referring to FIG. 5 herein, there is illustrated a simple example of how a first port 1000a of a first network element is represented by a first end point template 1001, and second and third ports of a second network element 1002 are represented by second and third end point templates 1003, 1004 respectively and how connectivities between the three ports are represented.

Connection termination points 1005, 1006 at each of respective second and third end points 1003, 1004 are illustrated in FIG. 5. Each of the end point templates 1001, 1003, 1004 comprise assemblies of trail termination point templates at different layers within a port as described with reference to FIG. 4.

Each end point template type describes a different type of pre-configured structure within a network element, eg a physical port type, or a particular logical port type. Interconnectivity between different network elements is catered for by an external connection rule identified schematically as link 1007 in FIG. 5.

Figure 6:
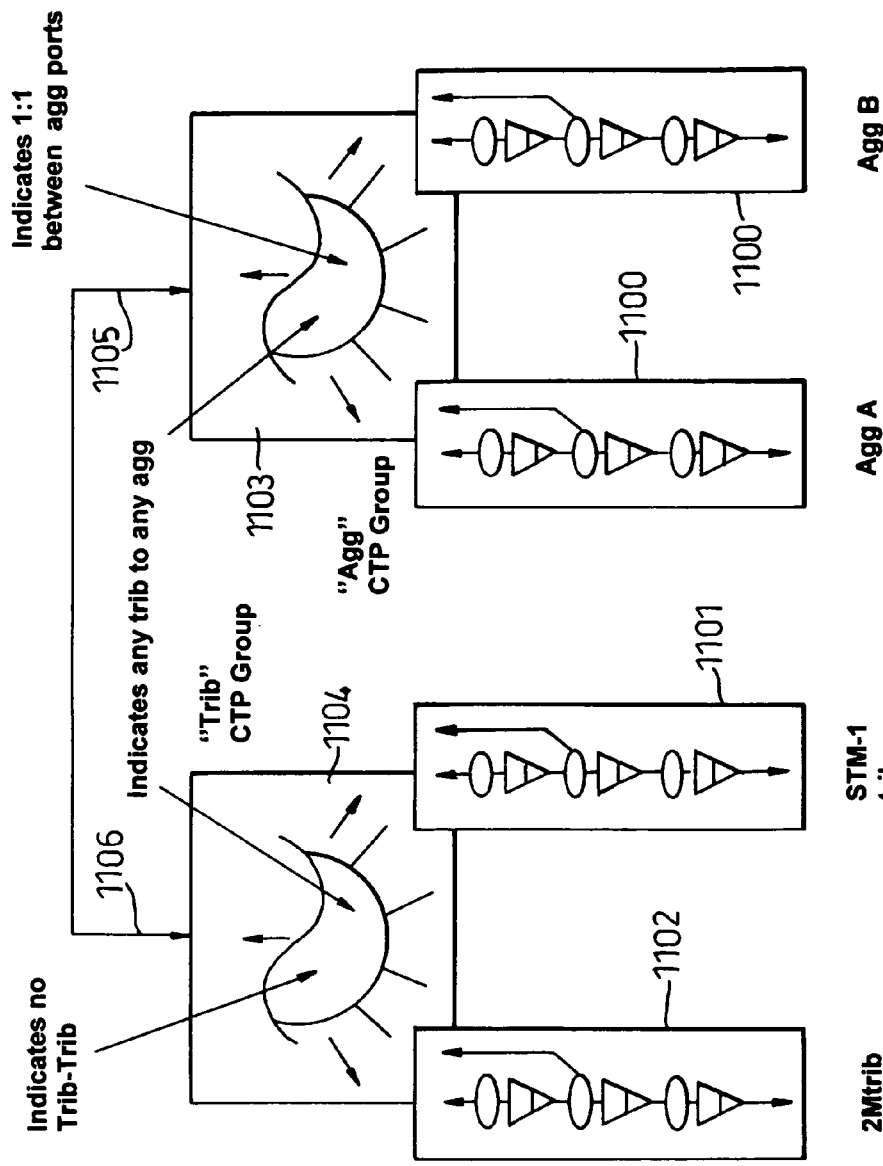
FIG. 6 illustrates schematically an inter-relationship between first and second sets of connection rules according to the specific implementation of the present invention, each set of connection rules representing connectivity between ports of a network element.

Referring to FIG. 6 herein, there is illustrated schematically a relationship between connection termination point groups and end point templates for a plurality of ports of a single network element. The network element shown in FIG. 6 has first and second aggregate ports AggA, AggB, a STM-1 tributary port, and a 2 Mbit/s tributary port. FIG. 6 shows a relationship between these four individual ports. As is apparent to those skilled in the art, in practice, a network element may have many more ports.

In FIG. 6, a single aggregate end point template 1100 represents both of the first and second aggregate ports AggA, AggB respectively. A STM-1 tributary end point template 1101 represents the STM-1 tributary port, and a 2 Mbits/s tributary end point template 1102 represents the 2 Mbits/s tributary port.

The representation in FIG. 6 of the AggA and AggB end point template 1100 represent instances of enrolment of ports AggA and AggB. The STM tributary port enrolls with STM-1 tributary end point template 1101 and the 2 Mbits/s tributary port enrolls at element controller 606 with 2 Mbits/s tributary end point template 1102. End point data representing ports AggA and AggB also include a reference identifier to a first CTP group template (Agg CTP group) 1103. End point data referring to the STM-1 tributary port and the 2 Mbits/s tributary port include reference identifiers pointing to a second CTP group template 1104 (trib CTP group).

Figure 11:
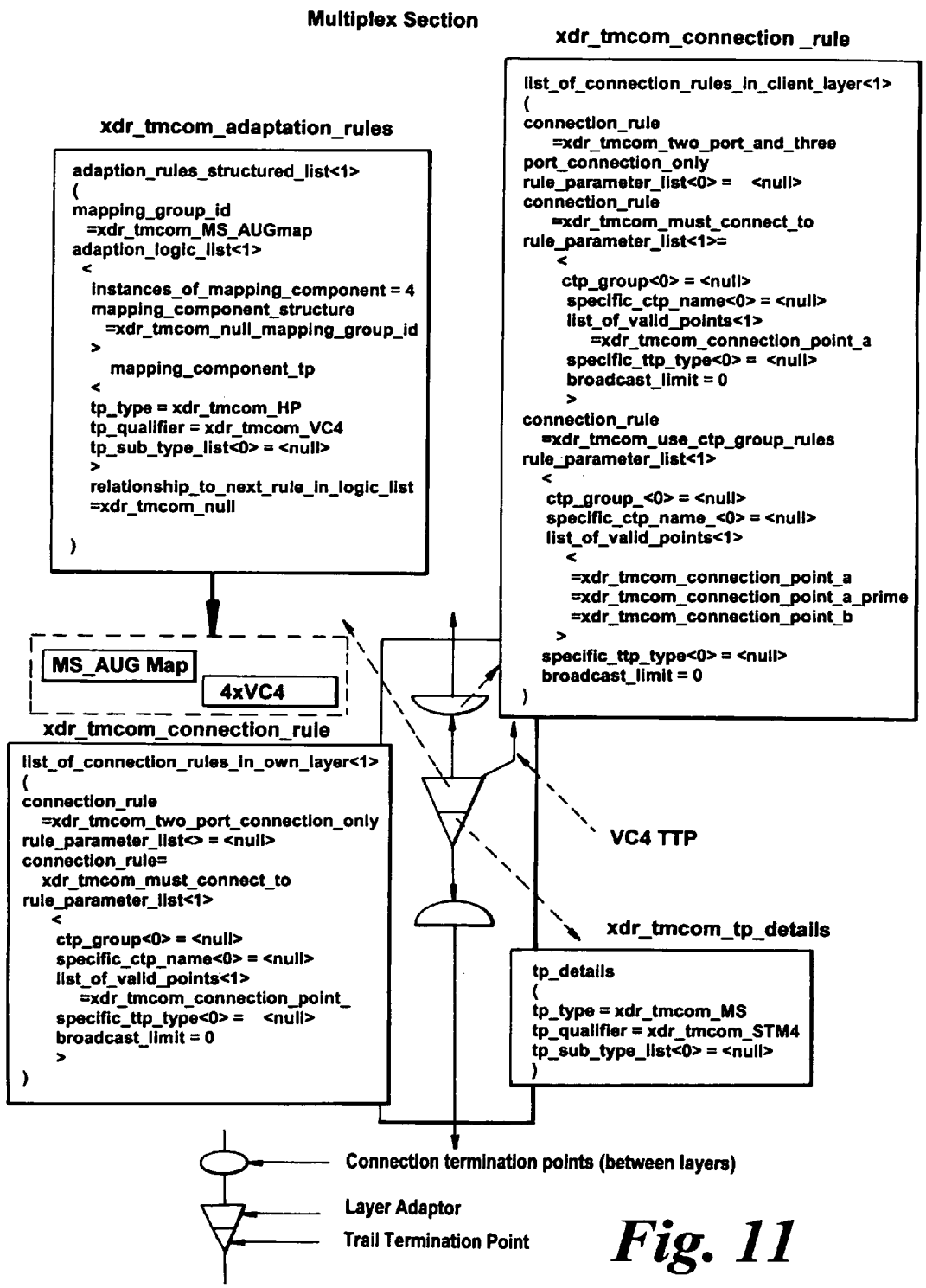
FIG. 11 illustrates schematically a data template representation of a trail termination point at a multiplexed section layer of the SDH port as shown in FIG. 7.

In this example, the trib CTP group 1104 may include a first connection rule which specifies that no port enrolled with the trib CTP group 1104 can connect to any other port also enrolled with the trib CTP group 1104, and contains a second rule specifying that any port enrolled with trib CTP group 1104 may connect with any port enrolled with Agg CTP group 1103. This connection rule is indicated by single-ended arrow 1105 in FIG. 11.

Agg CTP group 1103 includes a connection rule within the group indicating that a 1:1 connection between any ports within the Agg CTP group 1103 is permissible. Also, Agg CTP group 1103 contains a connection rule specifying that any port enrolled with Agg CTP group 1103 can connect on a 1:1 basis with any port enrolled in trib CTP group 1004 (indicated by arrow 1106). Thus, for the example shown in FIG. 6 no connections are available between ports enrolled with the trib CTP group, 1:1 connections are available for ports enrolled with the Agg CTP group 1103, and any port enrolled with the Agg CTP group 1103 can connect with any port enrolled with the trib CTP group 1104. This combination of end point templates and CTP group templates represents the multiplexer network elements connectivity within the network management system. Thus, an external application, eg an auto router may use the template representation stored in the network management system to learn about the capabilities of the multiplexer network element having AggA, AggB, STM-1 tributary and 2 Mbits/s tributary ports.

Referring to FIGS. 7 to 13 herein, there will now be described an example of a end point template for a STM-4 tributary port for a type TN4X multiplexer network element. The STM-4 tributary port comprises one of a plurality of ports within a multiplexer.

Figure 12:
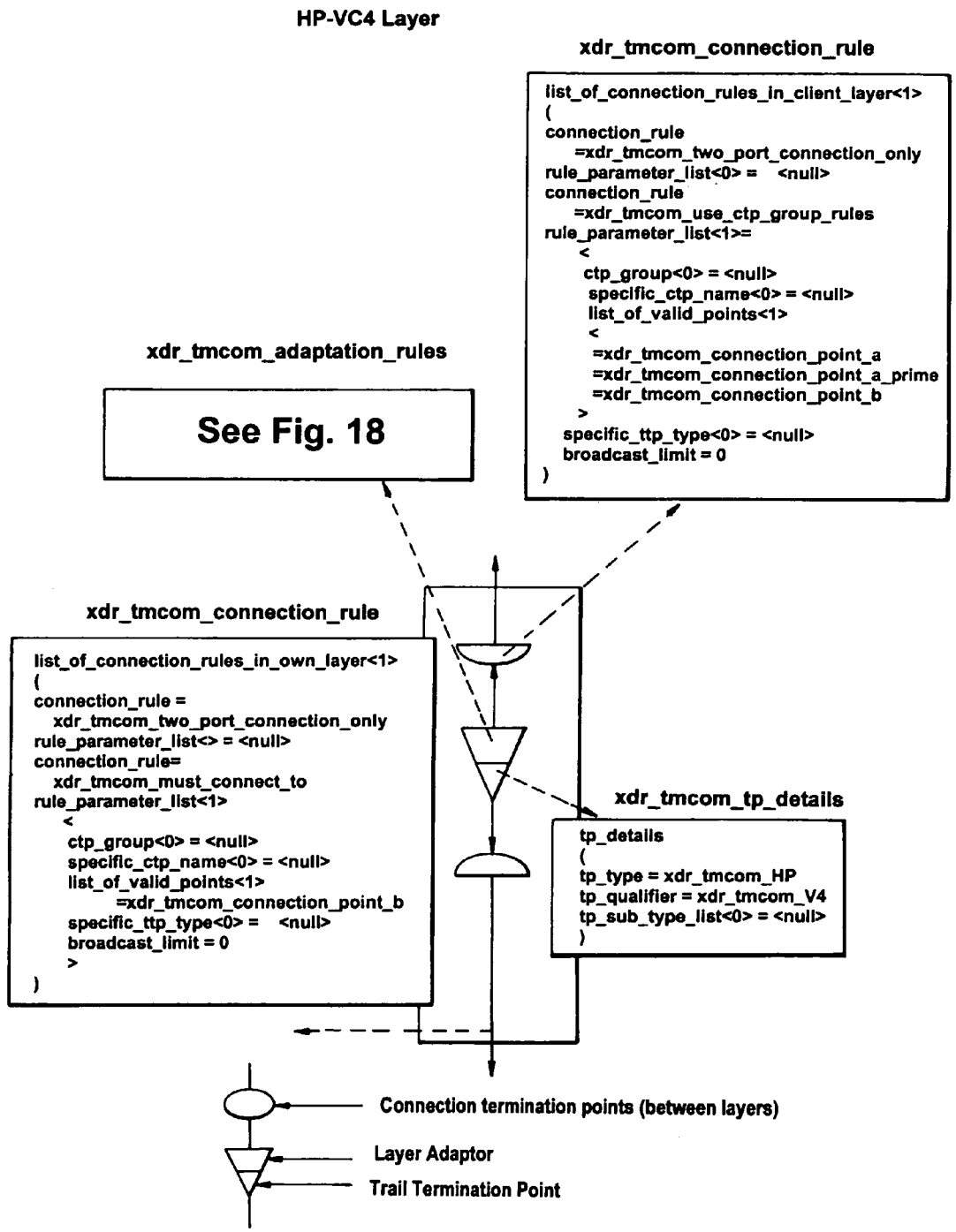
FIG. 12 illustrates schematically a data template representation of a trail termination point at a higher path layer of the SDH port as shown in FIG. 7.

In FIG. 7, an end point template comprises a plurality of trail termination point templates connected to each other in accordance with connection rules as hereinbefore described. Each trail termination point template represents an instance of a termination point within a layer of a protocol. Capabilities of a port are represented by representing the trail termination points at different layers in that port by an assembly of TTP templates. One TTP template represents an instance of a trail termination point within a port. In FIG. 12, a first end point 1200 represents a connection to a physical media section layer in an SDH environment. A second end point 1201 represents a connection termination point to a higher path virtual container for (HP VC4) layer.

Trail termination points are represented by triangles, layer adapters are represented by quadrilaterals, and connection termination points between layers are represented by semi-ellipses as described with reference to FIG. 4 herein.

A trail termination point to a VC4 layer is described by connection rules represented by a semi-ellipse 1202 as shown in FIG. 7, and access to a 2 MHz clock is described by connection rules represented by inverted semi-ellipse symbol 1203. Trail termination points at the physical media section, optical section, regenerator section STM-4 level, multiplex section STM-4 layer and higher path VC4 layer are represented by corresponding respective trail termination point templates 1204-209. The optical section 1205 may access a tributary section 1209 via connection rules 1210, allowing access to the optical section by a 2 Mbits/s tributary.

In FIGS. 8 to 13, there is illustrated a set of TTP templates comprising the end point template of FIG. 7 coded in external data representation (XDR) language. In the best mode herein, XDR allows platform independence of data templates as between the network manager and the element controller.

Figure 8:
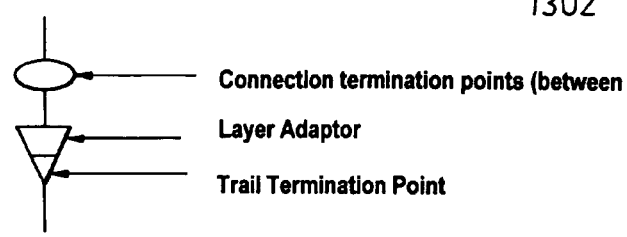
FIG. 8 illustrates schematically a data template representation of a trail termination point at a physical media section layer of a SDH port as shown in FIG. 7.
Figure 9:
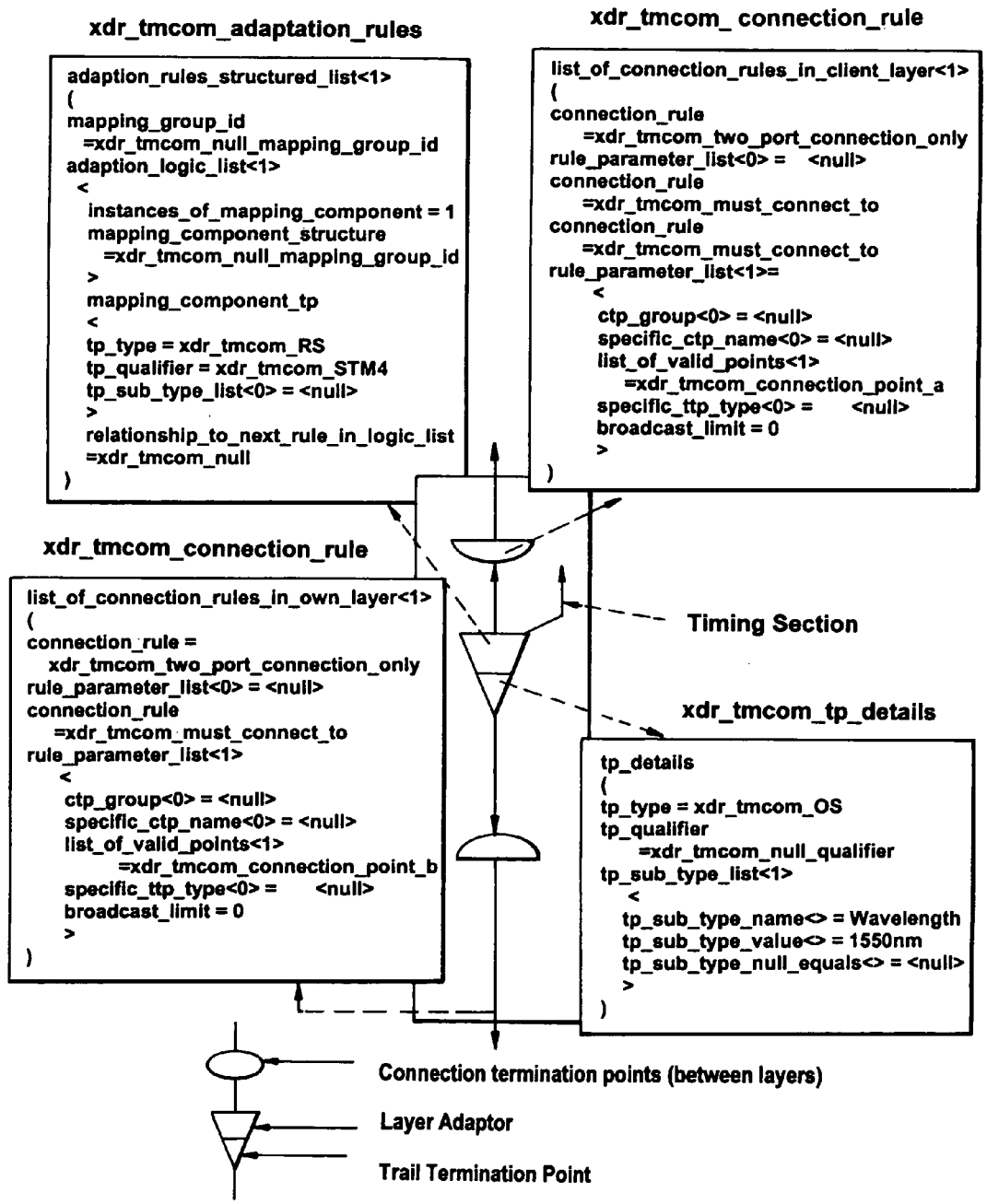
FIG. 9 illustrates a data template representation of a trail termination point at an optical section layer of the SDH port as shown in FIG. 7.
Figure 10:
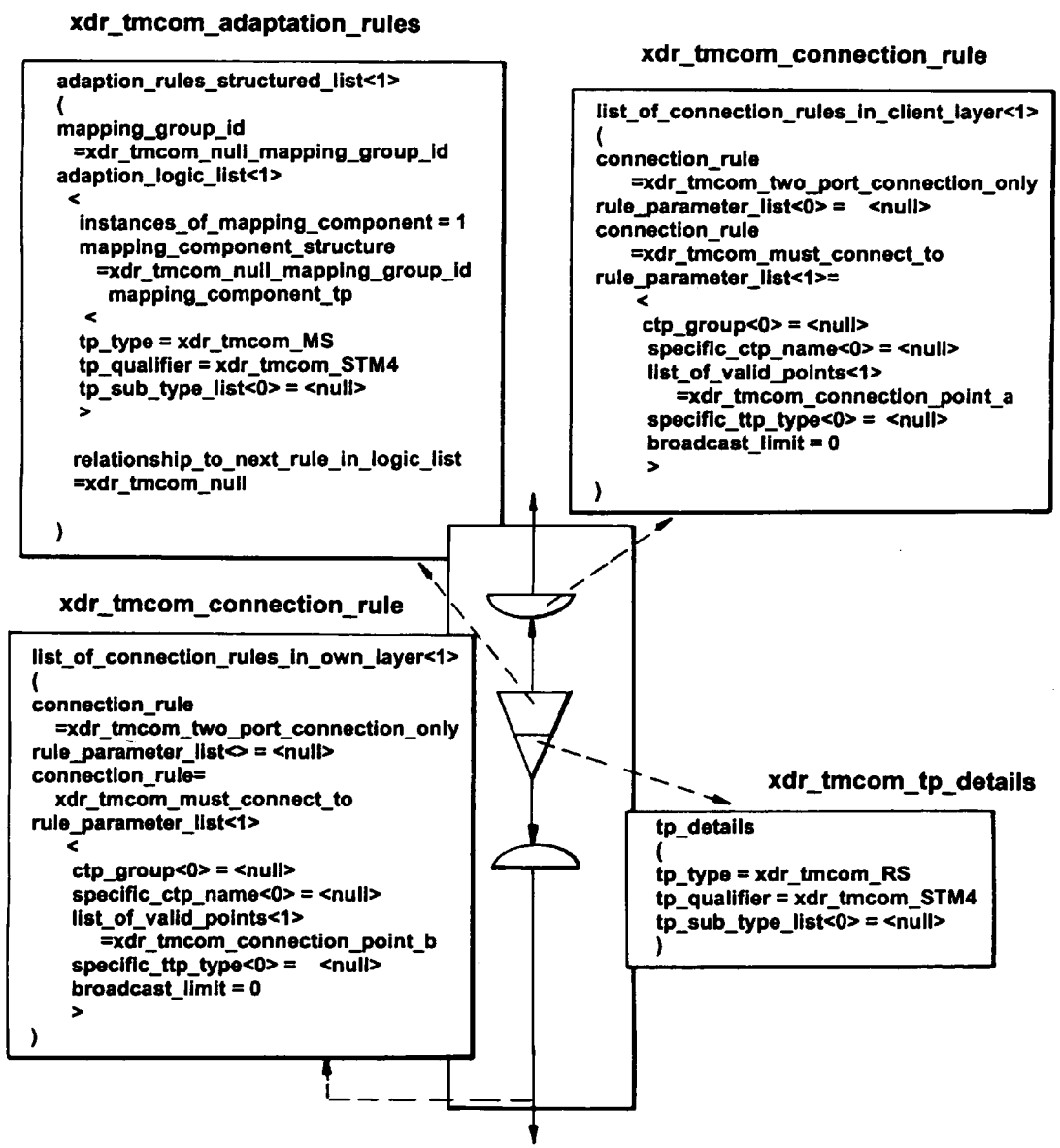
FIG. 10 illustrates a data template representation of a trail termination point at a regenerator section layer of the SDH port as shown in FIG. 7.

Referring to FIG. 8 herein, there is illustrated an example of a trail termination point template of a trail termination point of a port at a physical media section layer. Connection rules represented by semi-ellipse 1300 comprise rules describing external connection of the physical media section to other ports in a same layer, ie in the physical media section layer. A trail termination point of the port at the physical media section, represented by triangle symbol 1301 is described by trail termination point data parameters 1302. Detail parameters specify a layer of the termination point as a physical media section layer and that the termination point is connected to fiber transmission medium. Adaptation between the physical media section layer and a higher client layer as represented by adaptation quadrilateral symbol 1303, is described by a set of adaptation rules 1304.

Connection rules represented by inverted semi ellipse 1305 comprise rules specifying connection to other termination points in a client layer, other than the own layer of the termination point represented by triangle symbol 1301.

A connect_externally rule within connection rules 1300 represents a special case connection rule which extends outside the end point template and represents a connection between a port represented by the data template and one or more other ports.

Termination point data 1302 includes an sub_type_list field comprising a set of ASCII characters for containing additional parameters and type details of the termination point. Such additional characters may describe that the termination point supports a path trace capability. This may be included as for example path_type=pathtrace and parameter_value=supported_16 bytes or similar parameters. Trail termination point data 1302 comprises a complete definition of the trail termination point. Any special characteristics of the trail termination point other than its layer are described in the sub_type field. The data describing the termination point stored in the sub_type field represents features of the port which describe its capabilities. For example a capability may be supporting the path trace functionality. An external application using the termination point data 1302 for planning a service may use the capability information described in the trail termination point data to check for compatibility of connectivity between different ports. For example if a first end point template type shows a trail termination point supporting a path trace function, but a second end point template type shows a termination point not supporting path trace, then an external management application may be able to determine that the first and second end point template types are incompatible with each other in respect of the path trace capabilities supported by one end point template, but not the other.

Adaptation rules 1304 describe which other termination points the trail termination point (physical media section fiber trail termination point) is capable of mapping to. In the specific implementation described herein, using an XDR message set, adaptation rules 1304 comprise a logic list (adaptation_logic_list), the function of which is described with reference to FIGS. 17 and 18 herein. Whilst in the specific implementation shown herein the message set used is UNIX XDR, the termination point data 1302, own layer connection rule data 1301, client layer connection rule data 1306 and adaptation rule data 1304 are independent of the message set used, and in other implementations may be encoded in the known CORBA interface description language (IDL) or the known ASN1-GDMO message set.

Client layer connection rules 1306 provide a set of rules describing connection of the termination point to a client layer. Client layer connection rules 1306 are arranged in a similar structure to own layer connection rules 1301 in layout, and specify connection termination point groups to which the termination point may belong (ctp_group), (specific_ctp_name). Within the same end point template as shown in FIG. 7, there are own layer connection rules of a higher trail termination point template (optical section trail point template 1205) which correspond with the client layer connection rules 1306 of the physical media section trail termination point template of FIG. 8.

Referring to FIGS. 12 and 13, there is illustrated adaptation rule data 1800 for a higher order path VC-4 layer trail termination point template (FIG. 12) which illustrates a complex set of adaptation rules describing an SDH payload 1801. The SDH payload has tributary unit groups (TUG-3) which map to seven TUG-2's or a VC-3, and each TUG-2 maps to three VC-12's, or a VC-2. Since not all multiplexers support the full mapping, restrictions within the multiplexer may be described by the adaptation rules 1605. Further, although in this implementation adaptation rules 1605 are shown as supporting an SDH payload, the adaptation rules may be altered to support 64 Kbits/s where thirty 64 Kbits/s map into a 2 Mbits/s tributary.

The adaptation rules comprise a means of specifying an adaptation tree structure supported by a port. The adaptation rules comprise an adaptation logic list which sets out a tree structure of possible adaptations between layers in a protocol, for example the SDH protocol as shown in FIG. 13 herein. Mapping groups, eg TUG-2, TUG-3 are listed with corresponding respective instances of mapping components and identifications of mapping groups (mapping_group_id) and mapping component termination points (mapping_component_tp). This adaptation rule structure may be used to describe adaptations of other protocols, eg SONET or ATM.

Referring to FIGS. 1 to 3 herein, there will now be illustrated in general overview an example of a mode of operation of initialisation of a managed object base of network manager 607, e.g. on first installation of one or a plurality of network elements, or following a fault condition.

Element controller 606 controlling network elements 600-605, on initialization or re-initialization of a network, reports to network manager 607 all of the network elements 600-605 under its control. The following simplified example assumes that a set of end point templates and CTP group templates have been installed during manufacture on each of the newly introduced network elements 600-605 in the network, and that initially the templates are not separately loaded into the element controller 606.

In the specific embodiment considered herein, network element 604 comprises a TN-1X type multiplexer, storing a first end point template A describing a first port type. Second network element 605 comprises a further TN-1X multiplexer storing a second end point template B describing a second type of port. Third network element 601 comprises a TN-16X multiplexer storing a third end point template type C describing a third port type.

The first time that the network elements 600-605 are introduced into the network, they transmit by way of a message signal over the operations administration and maintenance channel to element controller 606 the full end point templates, i.e. end point templates A, B and C, by way of enroll messages between the network elements 601, 604, 605 and the element controller 606. Element controller 606 stores the three different types of end point template, A, B, C. Since in an SDH environment each of network elements 601, 604, 605 are configured in a layered manner, each end point template type describes the number of termination points at a corresponding port type at different layers which are mandatorily bound together.

This information is sent from the network elements to the element controller once only, on first introduction of the network element to the element controller as end point templates A, B, C. These end point templates may be arbitrarily assigned numbers, for example 1001, 1002, 1003 when stored in the element controller 606. Similarly, CTP group data describing the inter-connections between ports are each of the layers is transmitted from the network elements to the element controller once only, on first introduction of the network elements to the element controller.

Each port of the network element then enrolls at the element controller by sending a corresponding respective end point data to the element controller. Within a single end point message from the network element, is contained all the end point data for each of a plurality of ports on a card. Each card of a network element may enroll with a separate end point message. An end point data indicates which template type the port corresponds to, and data describing the location of the port, i.e. on which network element it resides. Within the element controller, there is then instantiated each of the objects within the indicated end point template type for that particular enrolled port.

There will now be described communications between network manager 607 and element controller 606 on initialisation of the network management system.

On initialisation of the network management system, the network manager interrogates each element controller in order to discover the capabilities of the network elements comprising the network. The end point templates are transmitted from the network elements to the element controller once only. Communication between the network manager and the element controller in the best mode implementation herein is by way of XDR messages across TCP/IP communication link. Although communications between a network manager and a single element controller are described herein, it will be understood that in the network having a plurality of element controllers, similar communications occur between the network manager and a plurality of other element controllers. Although the sequence of communications between the network manager and the element controller are described in this specific example in an initialisation operation, during general operation of the network management system, the messages described hereafter may be generated at any time by a network operator at the network manager, or by a network operator at the element controller.

Figure 14:
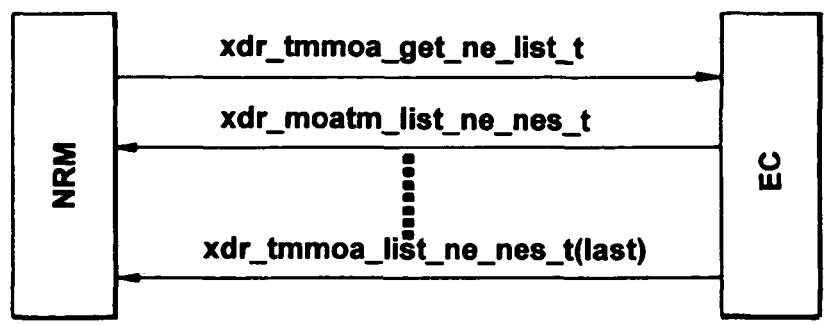
FIG. 14 illustrates schematically messaging between an element controller and the network manager for obtaining a list of network elements.

Referring to FIG. 14 herein, the network manager obtains a list of network elements connected to a particular element controller by sending a request message to the element controller over the XDR interface. An example of such a message is xdr-_tmmoa_get_any_list_t. The element controller responds by sending a separate message for each individual network element connected to the element controller, back over the XDR interface to the network manager. Such messages may take the form as follows: xdr_moatm_list_of_nes_t . . . xdr_moatm_list_of_nes_t(last), these being messages describing each network element connected to the element controller.

~~###

Having learnt of the network elements by interrogating the element controller, the network manager may then send an end point request message over the XDR interface in order to obtain a list of the end points corresponding to each physical and logical port within each network element connected to the element controller.

Figure 15:
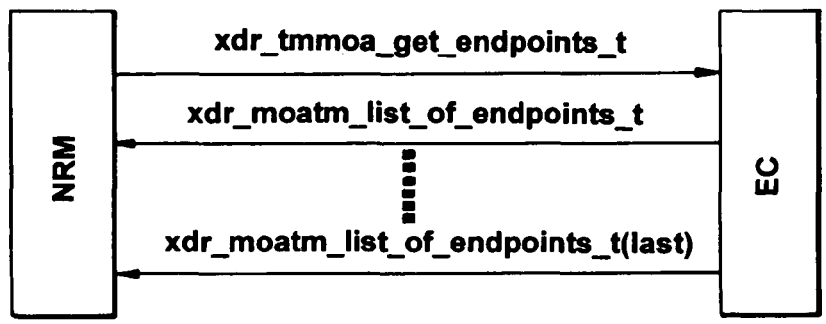
FIG. 15 illustrates schematically messaging between an element controller and a network manager for obtaining from the element controller a list of end points describing ports.

One end point per individual physical or logical port is transmitted from the element controller to the network manager. Using the XDR interface, a sequence of messages between the network manager and element controller in the specific implementations herein is illustrated with reference to FIG. 15 herein. The network manager issues an end point request signal in the form xdr_tmmo_get_endpoints_t. On receipt of this message, the element controller interprets this message as a request to transmit end points to the network manager, and proceeds to transmit a separate end point message for each end point of each network element connected to the element controller. All of the end points relating to a single element controller may be sent within a single XDR message from the element controller to the network manager. A format for an end point message over the XDR interface may take the following form:

xdr_moatm_list_of_endpoints_t . . . xdr_moatm_list_of_endpoints_t(last)

which contains information describing all end points of all network elements connected to the element controller.

An example of a communication of end point data between the element controller and the network manager may be summarized as follows:

```
struct xdr_tmcom_endpoint_info (
    xdr_tmcom_universal_location      location<>;
    xdr_tmcom_endpoint_template_id    endpoint_template_id;
    xdr_tmcom_ctp_group_list          list_of_ctp_groups<>;
    string                            ec_location<>;
    string                            user_label<>;
);
```

| Parameter | Content |
|---|---|
| location | location of the endpoint. |
| endpoint_template_id | endpoint template identifier signifying which template this endpoint belongs to. |
| list_of_ctp_groups | list of CTP groups that this endpoint belongs to. If the |

-continued

| | |
|---|---|
| | CTP groups have been defined in the endpoint template then this parameter should be set to NULL using a zero length list. |
| ec_location | string identifier for the endpoint as described above. |
| user_label | user label for this endpoint. |

Figure 16:
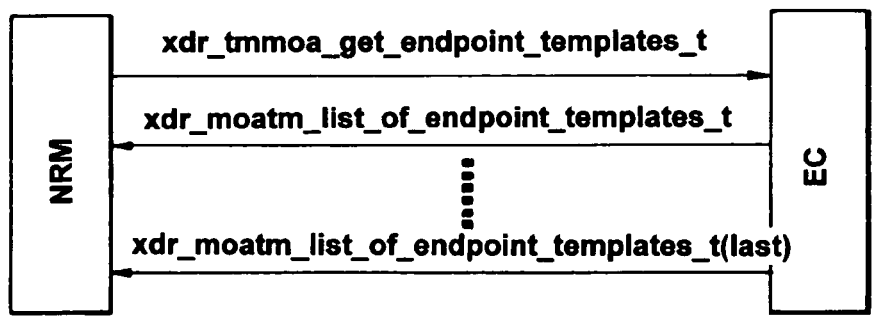
FIG. 16 illustrates schematically messaging between a network manager and an element controller for obtaining from the element controller a set of end point data templates representing internal physical resources of a plurality of ports of a network element.

Network manager 607 may learn about capabilities of network elements connected to element controller 606 by sending a message requesting end point templates from the element controller, over the XDR interface. An example of such a message is shown in FIG. 16 herein. Normally the network manager receives end point messages from the element controller. If it receives an end point message using an end point template reference identifier which it does not recognize, the network manager will request the corresponding end plate template from the managed object agent, to gain knowledge of the capabilities and capacities of those end points. Such a message may take the form xdr_tmmoa_get_endpoint_templates_t. Element controller 606 responds by sending data describing all end points relating to network elements to which it is connected back over the XDR interface to network manager 607. Such messages may take the form xdr_moatm_list_of_endpoint_templates_t . . . xdr_moatm_list_of_endpoint_templates_t(last).

An example of a message between the network manager and the element controller, describing an end point template is as follows:

```
struct xdr_tmcom_endpoint_template (
    xdr_tmcom_endpoint_template_id endpoint_template_id;
    xdr_tmcom_directionality     directionality
    xdr_tmcom_ctp_group_list     list_of_ctp_groups<>;
    unsigned long                number_of_instances_of_ctp;
    xdr_tmcom_ttp_template       list_of_ttp_templates<>;
):
```

An example of an identification parameter of the message is as follows:

```
struct xdr_tmcom_endpoint_template_id (
    unsigned long    xdr_tmcom_endpoint_template_number;
    string           xdr_tmcom_endpoint_template_name<>;
    unsigned long    xdr_tmcom_endpoint_template_parser_vintage;
);
```

Figure 17:
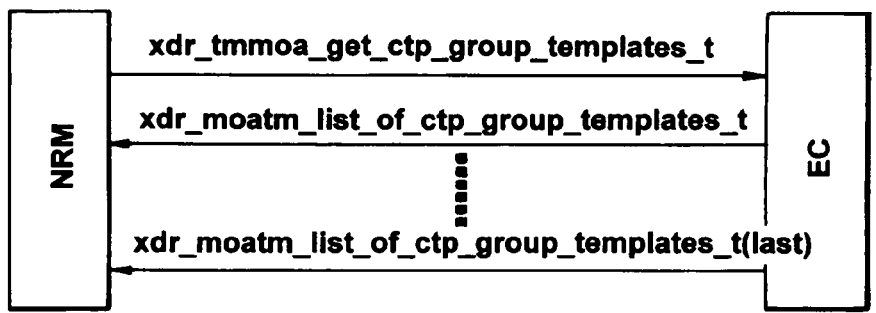
FIG. 17 illustrates schematically messaging between a network manager and element controller for obtaining from the element controller a set of connection termination point group data templates describing inter-connectivity between ports of a network element.

An example of an XDR message transmitted between the network manager and the element controller describing directionality may be as follows:
enum xdr_tmcom_directionality (
  xdr_tmcom_direction_not_applicable,
  xdr_tmcom_bidirectional,
  xdr_tmcom_unidirectional,
  xdr_tmcom_unidirectional_tx,
  xdr_tmcom_unidirectional_rx
);

Similarly, to obtain data describing the CTP groups connecting ports within network elements, network manager-issues a CTP template request message over the XDR interface. Element controller responds to the CTP group template request signal by forwarding XDR messages containing data describing the CTP group templates. Such messages may take the form xdr_moatm_list_of_ctp_group_templates_t . . . xdr_moatm_list_of_ctp_group_templates_t(last) as illustrated in FIG. 17 herein.

An example of the CTP group template identifier in an XDR message may be as follows:

```
struct xdr_tmcom_ctp_group_id (
    unsigned long    xdr_tmcom_ctp_group_number;
    string           xdr_tmcom_ctp_group_name<>;
    unsigned long    xdr_tmcom_ctp_group_parser_vintage;
);
```

There now follows a further example of operation of the network management system of FIG. 1, under conditions of introduction of a new port card into each of first and second network elements 601, 604. For example where network element 601 has an STM-1 port card, corresponding with another STM-1 port card on network element 604, there being an optical link 611 therebetween, each STM-1 port card always has the following layered termination point structure:
  a VC-4 termination point
  a multiplex section termination point
  a regenerator section termination point
  an optical section termination point
  a physical media section terminal point In the prior art network management system, when a new STM-1 port card is installed in a network element, the above list of termination points are enrolled individually for each port, each as individual objects by transmitting those objects from the port card to the element controller. This occurs for each time a new port card is installed in a network element, ie the same set of objects is transmitted from the new STM-1 port card to the element controller.

A network element transmits separate report messages describing the physical media section termination point, optical section termination point, regenerator section termination point, multiplex section termination point, VC-4 termination point, reports describing adaptation between the physical media section termination point and optical section termination point, reports describing adaptation between the optical section termination point and regenerator section termination point, a report describing adaptation between the regenerator section termination point and multiplex termination point, and a report describing adaptation between the multiplex section termination point and the VC-4 termination point. There are also transmitted a plurality of reference identifiers relating those termination points and adaptation points together.

This information is exactly the same as the information transmitted by first network element 601 when it enrolled its STM-1 port card. Further under conditions of fault when the element controller loses information describing the network elements, in the prior art case, each port card enrolls individually, causing duplication of the data transmitted between the network elements and the element controller but sending the same information. For example, where there are eight STM-1 port cards in a network, there will be eight sets of objects, each describing the corresponding respective STM-1 ports in different network elements.

In the best mode specific implementation herein, once a set of an STM-1 port card end point templates have been transmitted from the network element to the element controller, each time a new STM-1 port card of the same type is installed in the network, a set of end points is transmitted in the form of a short message across the OAM channel from the network element to the element controller. Since details describing an STM-1 port card are already stored in the end point template describing the STM-1 port card at the element controller, it is not necessary for the newly introduced STM-1 port card to transmit data describing each of its termination points, since this information is already installed at the element controller within the existing STM-1 end point template. Instead, the network element transmits the end points corresponding to the new ports, which is much shorter in terms of bytes of data than the full STM-1 port card end point templates.

Thus, transmission of the end point message represents a significant data compression over the prior art case. Further, under conditions of faults in the network, if the information describing the network elements is lost from the element controller, and the network elements need to re-enroll at the element controller, the relatively short end point data types are transmitted from the network elements to the element controller, referencing the end point templates corresponding to the particular ports contained within those network elements.

Figure 18:
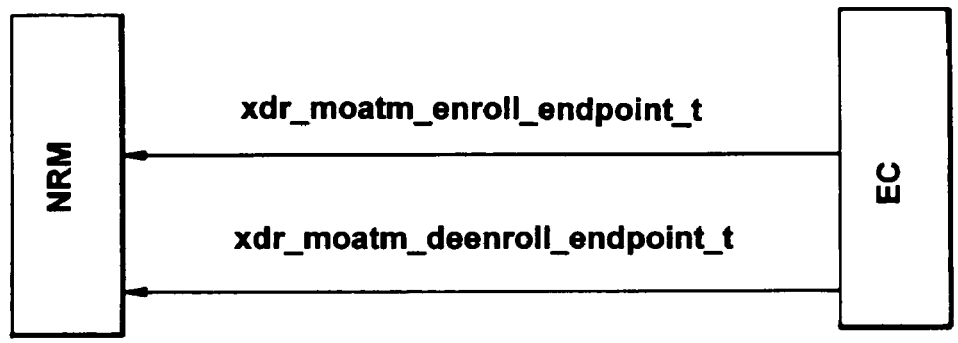
FIG. 18 illustrates schematically messaging between an element controller and a network manager for enrolling a plurality of ports at the network manager.

Upon enrollment of a port, an end point may be notified to the network manager via the XDR interface upon initiation of the element controller. The element controller can notify the network manager of enrollment or of de-enrollment of an end point by XDR messages across the XDR interface. Examples of enrollment and de-enrollment messages are illustrated in FIG. 18 herein.

In the specific implementation herein, element controller 601 recognizes that first and second multiplexers 604, 605, are of the same type and recognizes that STM-1 ports at each of first and second multiplexers 604, 605 are of a same type and therefore each have a same relationship of termination points and adaptations as each other.

Trail Structure Identification and Pattern Recognition

Advantageously, the template representation of the available resources of network elements can be used to provide network management data in a form which can be analysed to determine if a certain connectivity characteristic is present.

For example, by using templates, a means to further classify a trail in accordance with its connectivity characteristics, e.g. its connection rules, such that trail structures can be identified, can be provided.

A "trail structure" is here defined as a structure formed by a trail constructed between a plurality of network elements which have at least one connectivity characteristic in common. A trail structure is thus formed when the connectivity characteristics (or equivalently CTP group templates) exhibit a predetermined pattern. Advantageously, optionally the logical and/or physical layers of the network forming a trail can be monitored during a trail build process. Logical connectivities between physical pre-configured structures tend to repeat across a family of NEs, and are thus able to be represented by a limited set of data template types. Certain arrangements of certain types of NEs provide topological structures within a network. The structures may not be completely confined to a single level of the network, but may in fact only be present if more than one layer or level of the network is examined.

Figure 19:
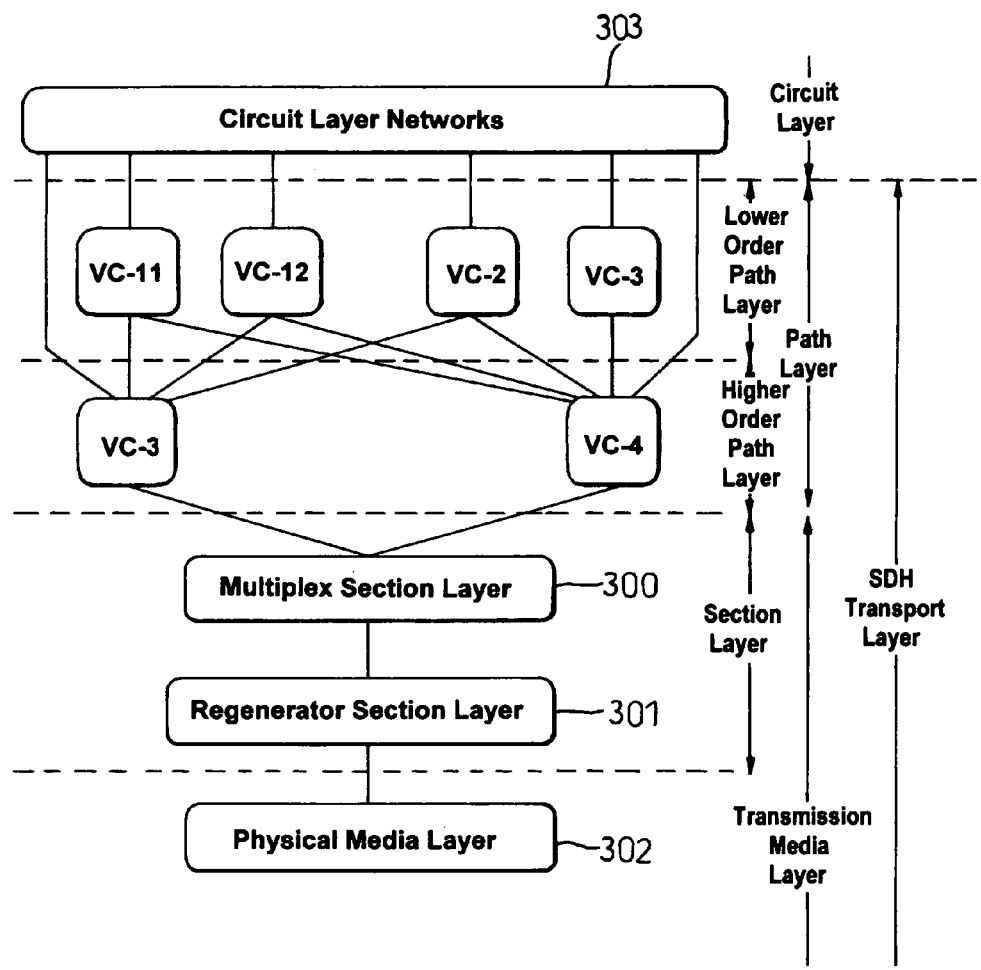
FIG. 19 illustrates the layered structure of the SDH transport network.

FIG. 19 shows various layers with the SDH transport layer (see FIG. 19). One or more of the illustrated layers may be involved during a trail build operation, for example, when building a trail across a network, both the higher path layer and also over the lower order path layer of the SDH transport layer may be involved, depending on the multiplexing involved.

Figure 20A:
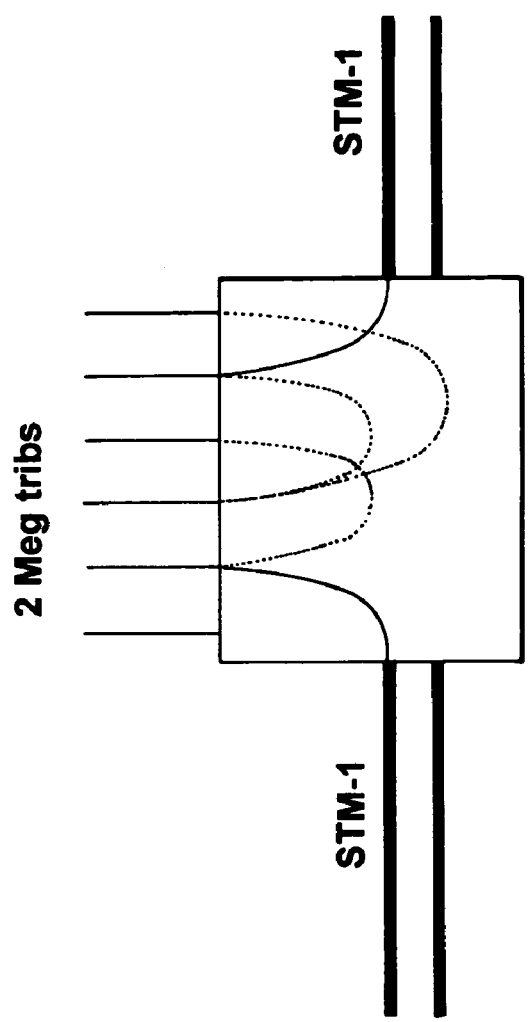
FIG. 20A illustrates connectivity constraints in a network element.

As an example, consider the connectivity arrangement supported by the network element illustrated in FIG. 20A. In FIG. 20A, a network element is shown having two STM-1 lines and a number of 2 Mbit/s tributaries. The internal port connectivity, which is not otherwise visible is sketched between the high bandwidth STM-1 lines and the tributaries. In FIG. 20A, connectivity is illustrated with a solid black line, whereas nonconnectivity is illustrated by a dashed line.

Figure 20B:
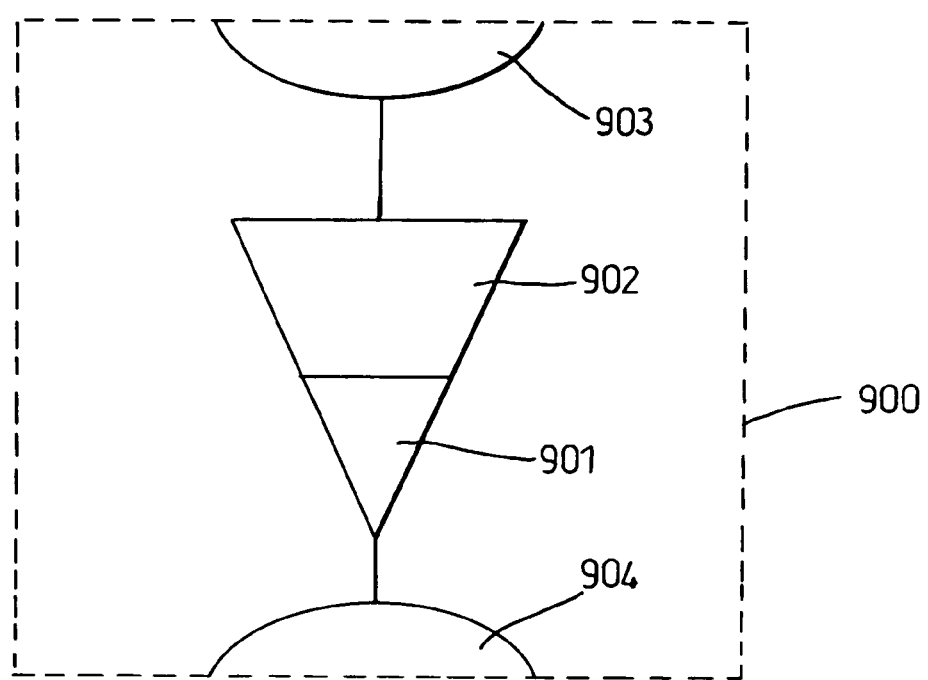
FIG. 20B illustrates a template indicating the connectivity constraints of the network element shown in FIG. 20A.

FIG. 20B shows a template indicating the internal port connectivity, which enables an external device to have visibility of the internal port connectivity. The template shown in FIG. 20A enables details of the port capacity, adaptation rules and edge connectivity to be determined. In this context, the template provides a self-descriptive interface.

As described hereinabove, the template can be stored in a Managed Object Database to enable an application to extract certain information regarding the connectivity constraints and rules governing the network element.

For example, during a trail build process, certain features provide by one network element may in conjunction with features present in an adjacent network element along a trail, may provide an advantageous characteristic to the trail. For example, bi-directionality is not a feature which can be determined from examining a single template. At least two templates are required to determined whether bi-directionality between two ports is supported. More complex features require the collation and assimilation of information from more templates.

In this way, by examining a plurality of templates, certain features of a trail which may not be recognisable initially during a trail build process, can be drawn to the attention of a network operator or the mechanism implementing the trail build. This is particularly advantageous if a network operator would otherwise be unaware that by selecting certain network elements/templates to form part of a trail, such a feature could be supported. The term "trail build process" is used herein with its conventional meaning as known by those skilled in the art, i.e., a process implementing the design and activation of a trail, for example, for the purposes of building an infrastructure for an end user service. The trail building process thus involves an initial process to discover the configuration of the node from the template describing its connectivity capability, and associates the rules discovered from the template of the node (or a proxy) with the appropriate components of the node.

For example, referring now to FIG. 21A, which shows a first embodiment of a trail structure according to the invention. In FIG. 21A, the predetermined pattern to which a CTP group template conforms is for 1:1 channel connectivity to be provided between four nodes A, B, C, and D. The term node may, for example, refer to a line or port card, and one or more line or port card may be provided within an individual network element.

FIG. 21A shows four nodes A,B,C,D. Each node is capable of receiving data along channels a,b,c and is capable of outputting data along STM-1 channels a,b,c. Each node (eg. A) is further provided with a number of 2 Mbit/s tributaries Wa,Xa, Ya,Za, A network operator is seeking to establish a trail from tributary Xa to tributary Yd.

In FIG. 21A, nodeA performs a 1:1 map such that data input along channel a is outputted along channel a, similarly data input along channel b is output along channel b etc. Appropriate templates indicating the internal connection rules are provided within a managed object database which is accessed by an application used to configure the trail. A network operator is thus able to perceive that node A provides appropriate connectivity for tributary Xa to be output to channel b, for example.

In FIG. 21A, at the STM-1 level, nodes A, B, C, and D all display the same 1:1 connection characteristics. Accordingly, an network operator/mechanism building the trail from Xa to Yd would perceive only the 1:1 connection capabilities of the nodes selected for the trail.

However, consider where node A and node C are further provided with a VC-3 link δ, where traffic flow along the VC-3 link δ is bi-directional such as FIG. 21B shows. As a trail is built between nodes A and D, it is advantageous if the network operator can provision some protection into the trail. However, unless the operator is aware of the other channel between A and C and that it is able to support a VC-3 link, the network operator would not be able to exploit this additional connectivity of the A and C nodes if the network operator were not able to examine and compare the connectivity of more than one node, in particular of non-adjacent nodes along the trail.

To exploit the fact that a protection channel exists between nodes C and A, which may involve other intermediate nodes which are not indicated for clarity in FIG. 21B, the templates from each node along the trail are collated and examined during the trail build process to determine if one or more patterns in the connectivity capabilities of the nodes are present.

The network operator seeking to build a trail between A and D is thus able to determine what if any structures are formed by the templates for the nodes by examining the connection rules which identify by the internal connectivity characteristics of the nodes for one or more of these certain predetermined "patterns". Thus, even if the network operator is initially only examining the STM-1 connectivity provided and is unaware that nodes A and C can provide a protection channel along link δ, once node c is selected during the trail build, the present of link δ will be automatically indicated.

In this way, it is possible for a network operator to provision protection channels even if the network operator is previously unaware that protection can be offered for such trails. For example, if channels a,b,c provide STM-1 links at the optical layer, channel δ may instead be provided in a higher non-optical layer, an provide an electrical link. In this way, by collating and examining the connectivity capabilities of a plurality of nodes (or equivalently network elements) it is possible for the presence of bi-directional line switched ring (BLSR) segments, for example, to be identified during the trail build process.

In one embodiment of the invention, the following steps take place during the trail build operation to enable the presence of such a BLSR segment to be discovered, i.e. to enable the N.O to identify that a bi-directional link exists between nodes A and C.

Firstly, as the trail build operation is performed by the N.O, the operator or routing engine navigates through the network topology from node A to B, B to C, etc until the trail is completed.

During the trail build process, at each node the navigation rules are verified and applied by a) providing the rule engine with an entry port;
b) collating the rules associated with the entry port in each connection layer of the trail;
c) identifying whether the port is interconnectable with other ports of the node;
d) If the port is connectable, determining each rule related to the other ports of the node and navigating their rules to determine which are connectable;
e) collating the rules for all ports of the node and analysing the collated rules as a set to determine other super set of rules. For example, some rules may consider other rules, some rules may relate to the while port, whereas other rules may only apply to some specified channel combinations.
f) determining from the superset of rules what legal exit ports exist for a node;
g) depending on selection criteria, either the list available port or selected automatically or entire set of allowable ports indicated for the network operator to select.

It is possible to perform the verification only when an initial trail has been build, and to reconfigure the trail accordingly. Alternatively, at each node a previously selected route can be indicated on a per node basis which enables those rules which are visible only by correlating rules from a plurality of nodes to be determined. This enables any variation in rules/connection constraints, to be determined especially rules/constrains relating to unidirectional/bi-directional connections and protected/unprotected connections.

For example, a basic set of rules to be examined may comprise that a node:

a) can connect to any channel on any port in group;
b) can connect to same channel on any port in group; and
c) cannot connect to any port in group.

By collating rule sets for a plurality of nodes along a trail during the trail build process, a 'superset' of connection templates can be identified within the network connectivity topology. In this way, BLSR and also UPSR (Unidirectional Path-Switched Ring) characteristics which could be supported by the trail can be integrated into the trail.

More complex BLSR topologies can be identified and integrated into trails with increased ease by virtue of collating and examining the templates representing the connectivity characteristics of nodes forming the trail, either during or after the trail build process. Examining the templates enables recognition of any pattern(s) formed by the superset of connectivity rules of the nodes comprising the trail. In particular, the type of APS (Automatic Proction Switch) identifier can be provided, and determining when to provide it for a particular connection when automatic protection switching is required can be easily enabled. This is greatly advantageously over prior art systems which required a specifically coded solution.

Thus by utilising the template structure to identify 'patterns' in connectivity capabilities which are independent of the type of node and of the specific transport technology, a network operator is able to remotely determine whether a plurality of nodes can provide a certain network function. The network operator does not need to access any information in advance of a trail build to identify certain network topologies and/or functionalities, as the network management application is able to indicate these characteristics where relevant in the trail build process.

Numerous modifications and alternatives to the above embodiments are apparent to those skilled in the art as falling within the scope and spirit of the invention. The scope and spirit of the invention should not therefore be considered as limited to the above embodiments but is instead given by the accompanying claims.

The invention claimed is:

1. A method of identifying a connectivity characteristic structure in a trail provided between a plurality of nodes in a network, the method comprising the steps of:
   acquiring node information detailing for each port of each node of the trail, a connectivity characteristic;
   collating for at least a plurality of nodes forming the trail in said network each nodes respective acquired node information to form a set of connectivity characteristics for the trail; and
   analysing said set of connectivity characteristics to determine a set of at least one rule for the trail describing a connectivity characteristic structure of said plurality of nodes.

2. A method as claimed in claim 1, further comprising steps of:
- analysing said collated plurality of sets of at least one rule describing a connectivity characteristic to determine if there exists a connectivity characteristic structure which conforms to a predetermined pattern;
- in the event the collated connectivity characteristic structure conforms to a pattern, assigning a pattern identifier to said collated sets.

3. A method as claimed in claim 2, wherein said method is performed during a trail build operation.

4. A method as claimed in claim 2, wherein said method is performed after a trail build operation.

5. A method as claimed in claim 3, wherein said connectivity characteristic structure is indicated to a network operator performing said method.

6. A method as claimed in claim 3, wherein in the event a pattern identifier is assigned, an indication of said pattern identifier is provided to a network operator performing said method.

7. A method as claimed in claim 5 or 6, wherein said indication is provided visually.

8. A method as claimed in claim 2, wherein said pattern identifier indicates the network topology of said plurality of nodes over more than one layer of the network.

9. A method as claimed in claim 2, wherein said pattern identifier indicates a network topology of said plurality of nodes over a plurality of layers of the network.

10. A method as claimed in claim 2, wherein said pattern identifier indicates a network topology of said plurality of nodes over a plurality of layers of the network, and said network topology is taken from the group consisting of:
- BLSR; UPSR.

11. A method according to claim 1, wherein said connectivity characteristic feature indicates at least one criteria taken from the group consisting of:
- level of performance;
- quality of service;
- protection supported;
- shortest trail path;
- cost;
- bandwidth.

12. A method as claimed in claim 1, wherein the method is used to determine at least one potential characteristic of a trail prior the trail being constructed.

13. A method as claimed in claim 1, wherein the method is used to determine at least one potential characteristic of a trail prior the trail being constructed, wherein the trail is provided within the same network layer as the layer with respect to which the connectivity structure is to be identified.

14. A method as claimed in claim 1, wherein at least one of said plurality of nodes exists within a server layer of the network layer within with the connectivity structure is to be identified.

15. A method as claimed in claim 1, wherein at least one of said plurality of nodes exists within a different layer of the network.

16. A method of identifying a connectivity characteristic structure in a potential trail provided between a plurality of nodes in a network, the method comprising the steps of:
- acquiring node information detailing for each port of each node a connectivity characteristic of that port;
- collating for at least a plurality of nodes forming said potential trail in said network each nodes respective acquired node information to form a set of connectivity characteristics for the potential trail;
- analysing said collated plurality of sets of connectivity characteristics to determine if there exists a connectivity characteristic structure for the potential trail and which conforms to a predetermined pattern; and
- in the event the connectivity characteristic structure conforms to the pattern, assigning a pattern identifier to said collated sets, wherein said pattern indicates a network topology spanning more than one layer in the network.

17. A method as claimed in claim 16, further comprising analysing said set of connectivity characteristics to determine another set of at least one rule describing a connectivity characteristic structure of said plurality of nodes.

18. Apparatus for performing steps in a method of identifying a connectivity characteristic structure in a trail provided between a plurality of nodes in a network, the apparatus comprising:
- means arranged to acquire node information detailing for each port of each node a connectivity characteristic of that port;
- means arranged to collate for at least the plurality of nodes forming the trail in said network each nodes respective acquired node information to form a set of connectivity characteristics for the trail; and
- means arranged to analyse said set of connectivity characteristics to determine a set of at least one rule for the trail describing a connectivity characteristic structure of said plurality of nodes.

19. Apparatus as claimed in claim 18, wherein the apparatus includes a computer program.

20. A network management application program on a computer readable medium arranged to perform steps in a method of identifying a connectivity characteristic structure in a trail provided between a plurality of nodes in a network, the application including:
- means arranged to acquire node information detailing for each port of each node a connectivity characteristic of that port;
- means arranged to collate for at least the plurality of nodes, each nodes respective acquired node information to form a set of connectivity characteristics for the trail; and
- means arranged to analyse said set of connectivity characteristics to determine a set of at least one rule for the trail, describing a connectivity characteristic structure of said plurality of nodes.

\* \* \* \* \*